United States Patent [19]

Kintgen et al.

[11] 4,271,755

[45] Jun. 9, 1981

[54] BAG HANDLING APPARATUS

[75] Inventors: Dale I. Kintgen; William J. Mylrea; William A. Smith, all of Littleton, Colo.

[73] Assignee: Master Conveyor Corporation, Englewood, Colo.

[21] Appl. No.: 954,546

[22] Filed: Oct. 25, 1978

[51] Int. Cl.³ .................. B65G 57/24; B65G 15/14; B30B 15/14
[52] U.S. Cl. ............................ 100/52; 100/137; 100/151; 198/748; 414/62; 414/68; 414/82; 414/101; 414/907
[58] Field of Search ............... 414/62, 64, 68, 82, 414/89, 101, 907, 85; 198/627, 746, 748; 100/52, 151, 137

[56] References Cited

U.S. PATENT DOCUMENTS

| | | | |
|---|---|---|---|
| 2,780,340 | 2/1957 | Hynson | 414/62 X |
| 2,870,922 | 1/1959 | Thomson | 414/62 |
| 3,013,648 | 12/1961 | Kovach | 414/62 |
| 3,045,802 | 7/1962 | Miller | 414/62 X |
| 3,054,516 | 9/1962 | Joa | 414/45 |
| 3,142,389 | 7/1964 | Bolt | 414/85 X |
| 3,202,262 | 8/1965 | Jones | 198/748 |
| 3,581,876 | 6/1971 | Keith | 100/151 X |
| 3,587,876 | 6/1971 | Dahlem et al. | 414/907 X |
| 3,667,628 | 6/1972 | Gabler et al. | 414/85 X |
| 3,698,572 | 10/1972 | Dahlem et al. | 414/907 X |
| 3,986,621 | 10/1976 | Bowser | 414/101 X |
| 4,007,678 | 2/1977 | Gustavsson | 100/52 |
| 4,024,965 | 5/1977 | Marth et al. | 414/64 X |

Primary Examiner—Leslie J. Paperner
Attorney, Agent, or Firm—Ancel W. Lewis, Jr.

[57] ABSTRACT

Bag handling apparatus includes a bag flattener for flattening and evenly distributing the material in each bag and a bag palletizer having an infeed conveyor for metering the bags at a controlled rate onto a bag turner apparatus. The bag turner apparatus rotates selected bags from a stream of the bags either 90°, 180°, or 270° to orient the bags for forming a selected of a multiplicity of layer patterns on a live roller conveyor load table. From the load table a pusher bar transfers the bags onto a set of stripper plates which are separable for depositing the layer pattern of bags onto a pallet situated on a pallet elevator below the stripper plates. After each layer is deposited the layer is squared and then compressed by moving the deposited layers up against the stripper plates for vertical compression. Alternating layer patterns are loaded onto the pallet, with squaring and a vertical compression after each layer, until a full pallet load is obtained. The full pallet is then lowered and conveyed to a full pallet roller conveyor where it can be removed by a fork truck or the like. A pallet magazine is provided for stacking a supply of empty pallets for loading and a pallet separation mechanism and empty pallet conveyor feed the pallets one at a time as required from the magazine into the pallet elevator for loading.

38 Claims, 32 Drawing Figures

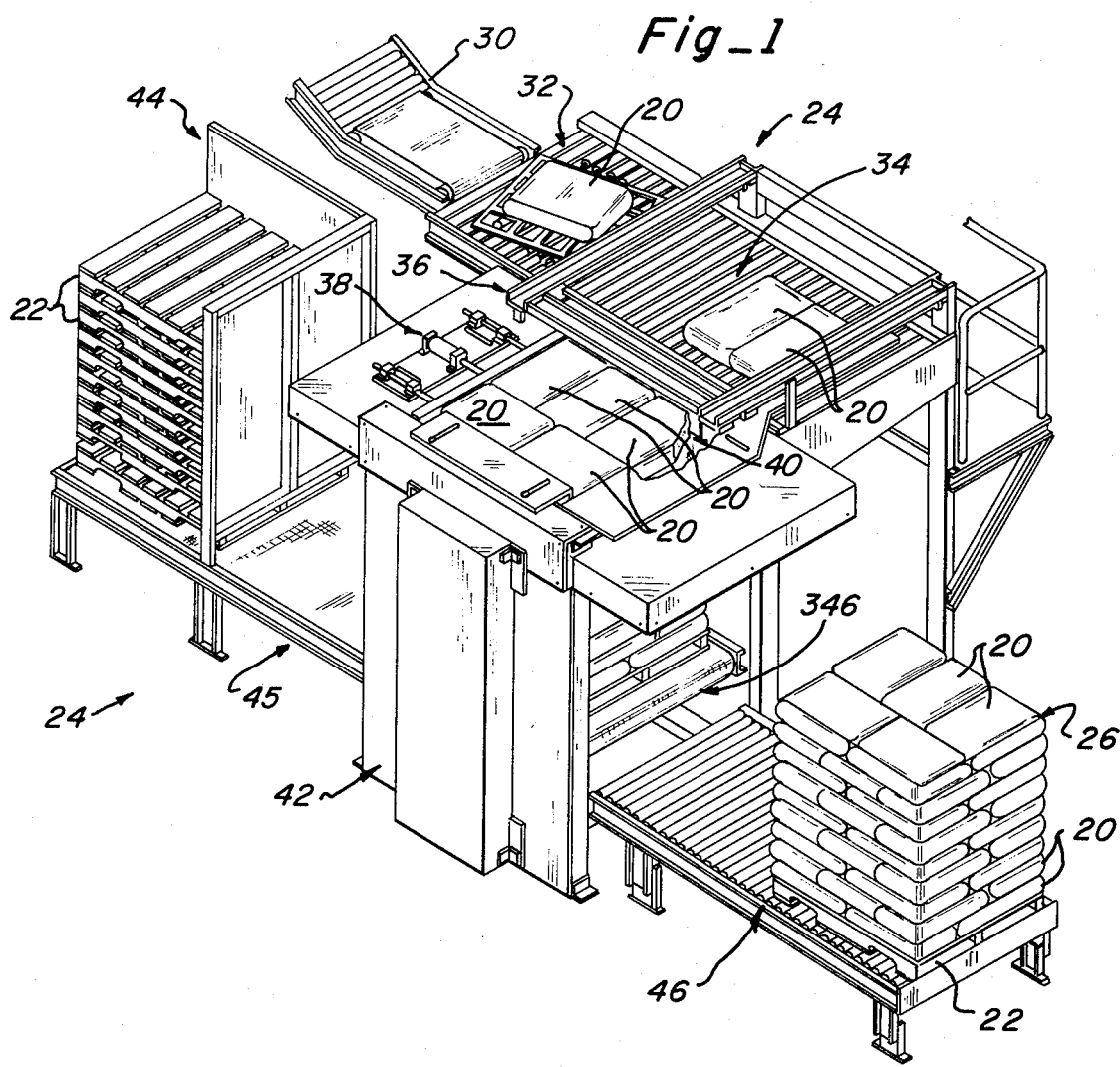

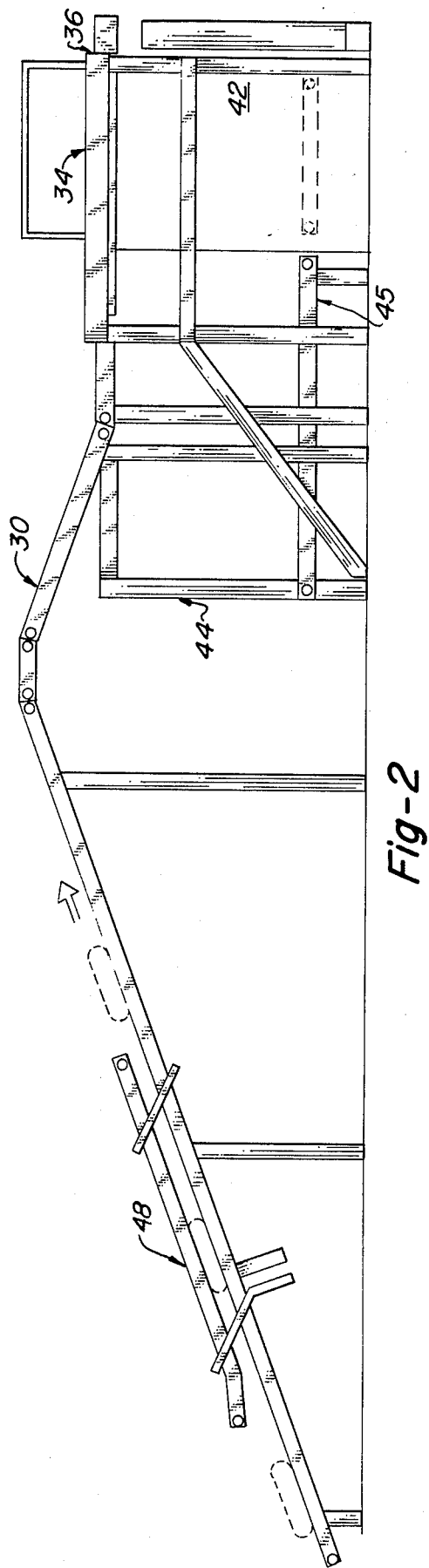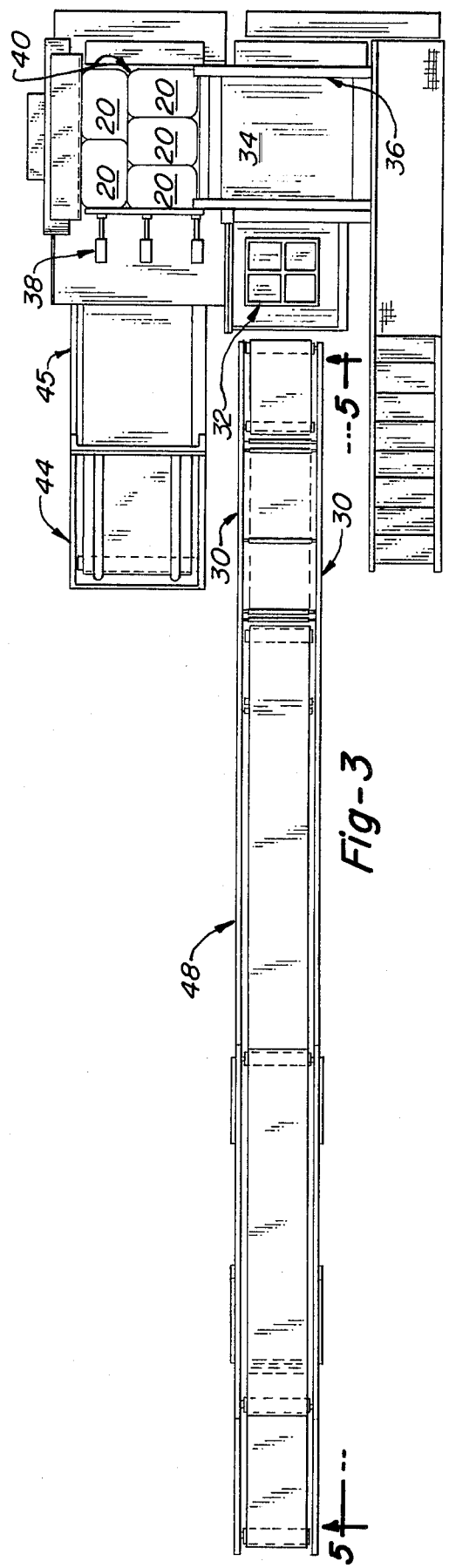

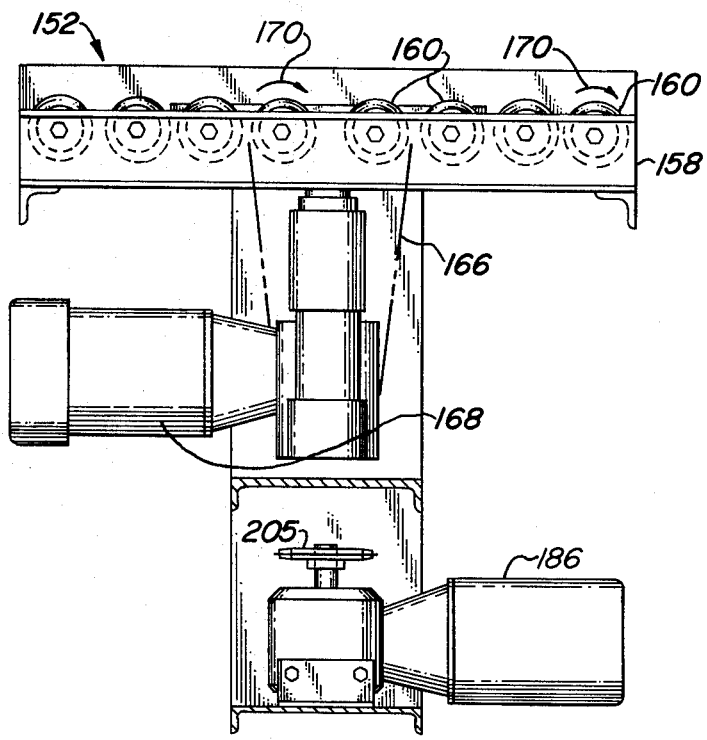
Fig-10
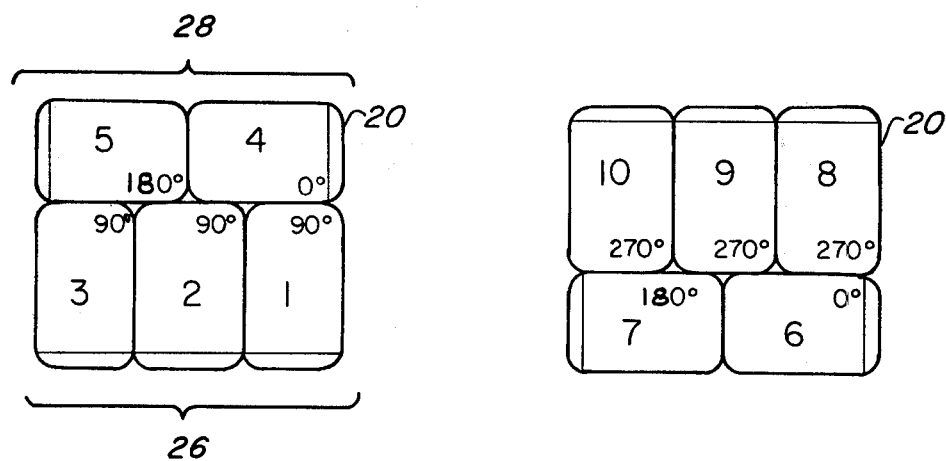
Fig_4
Fig_4a

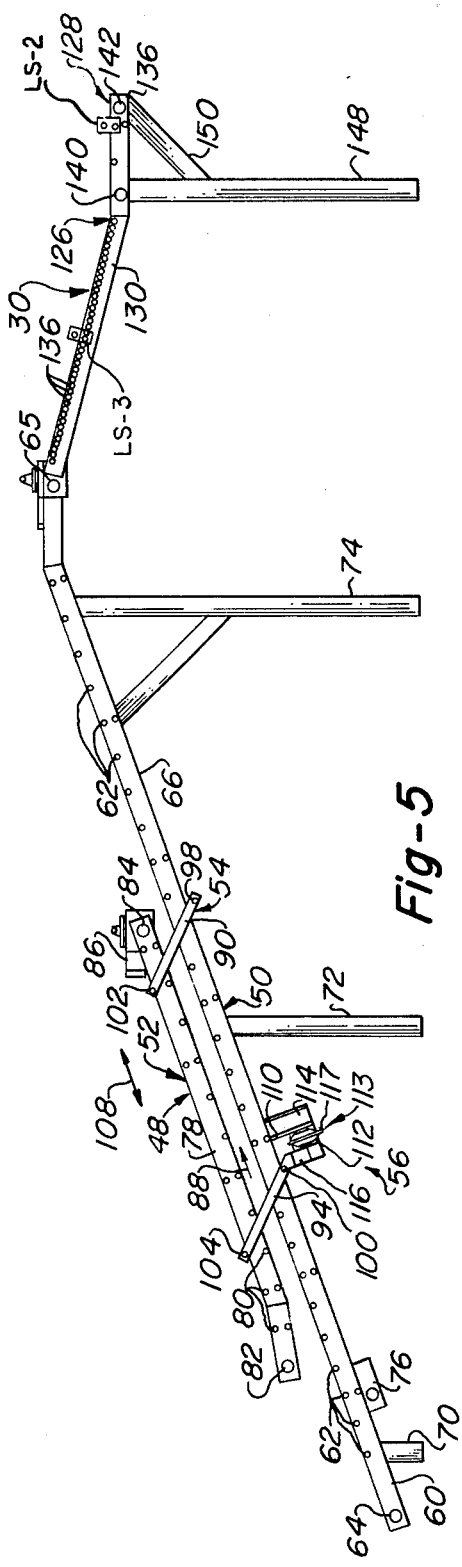
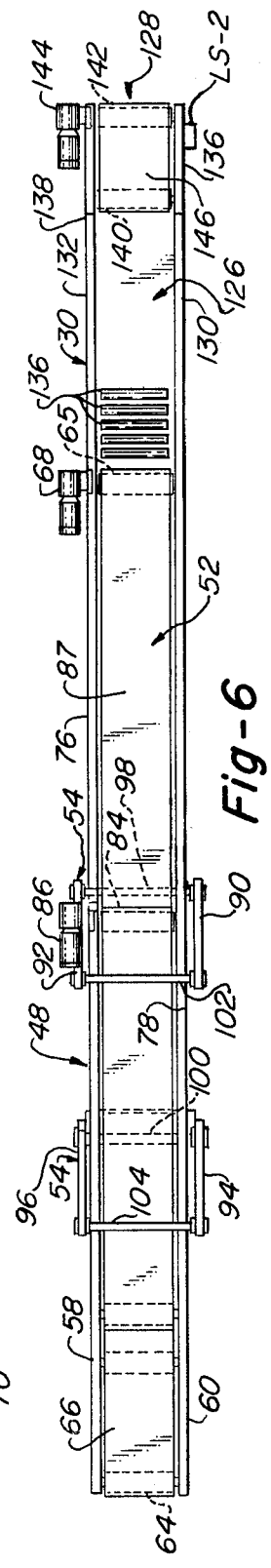
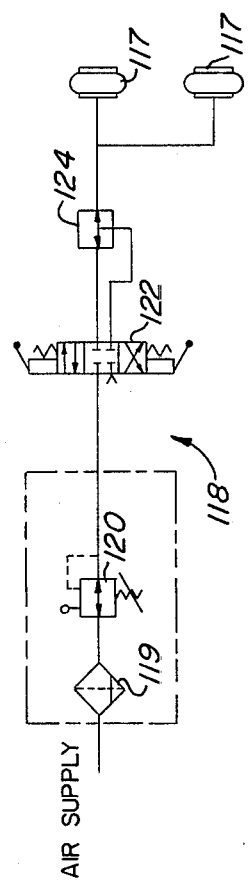

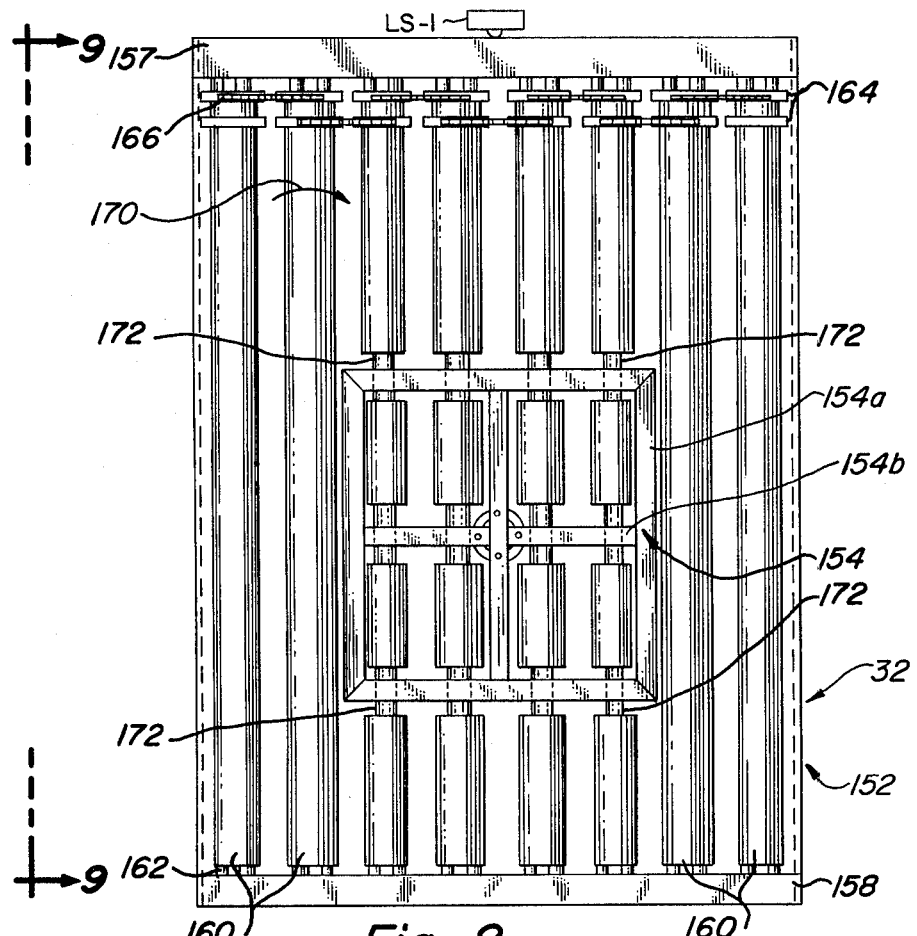
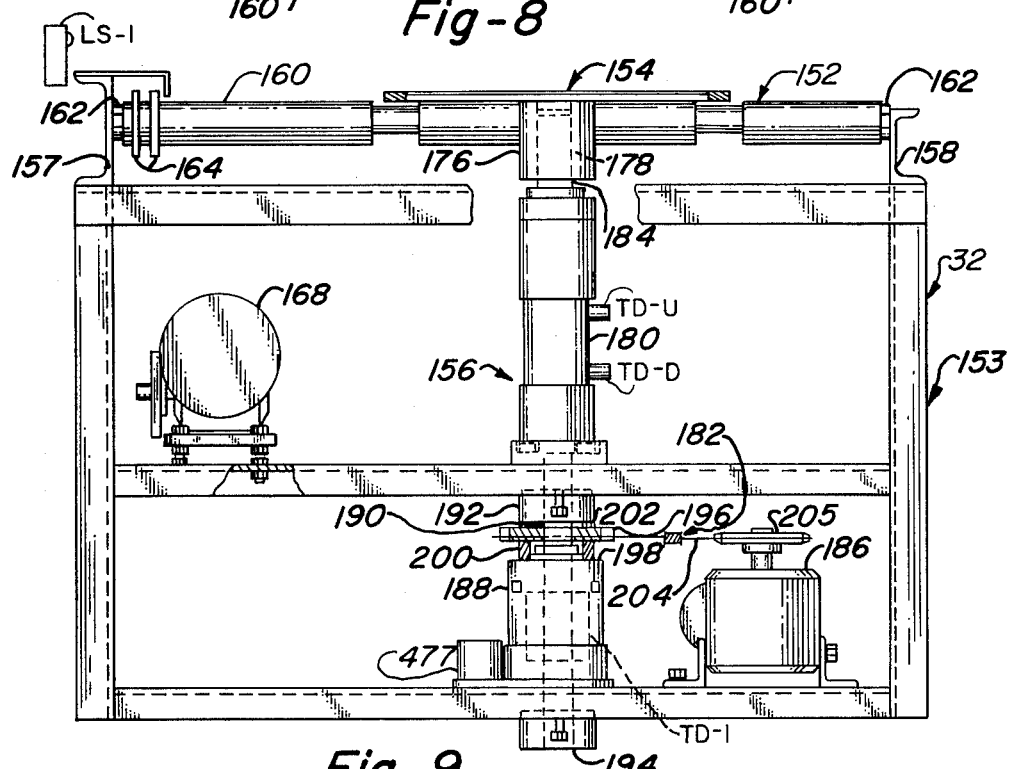

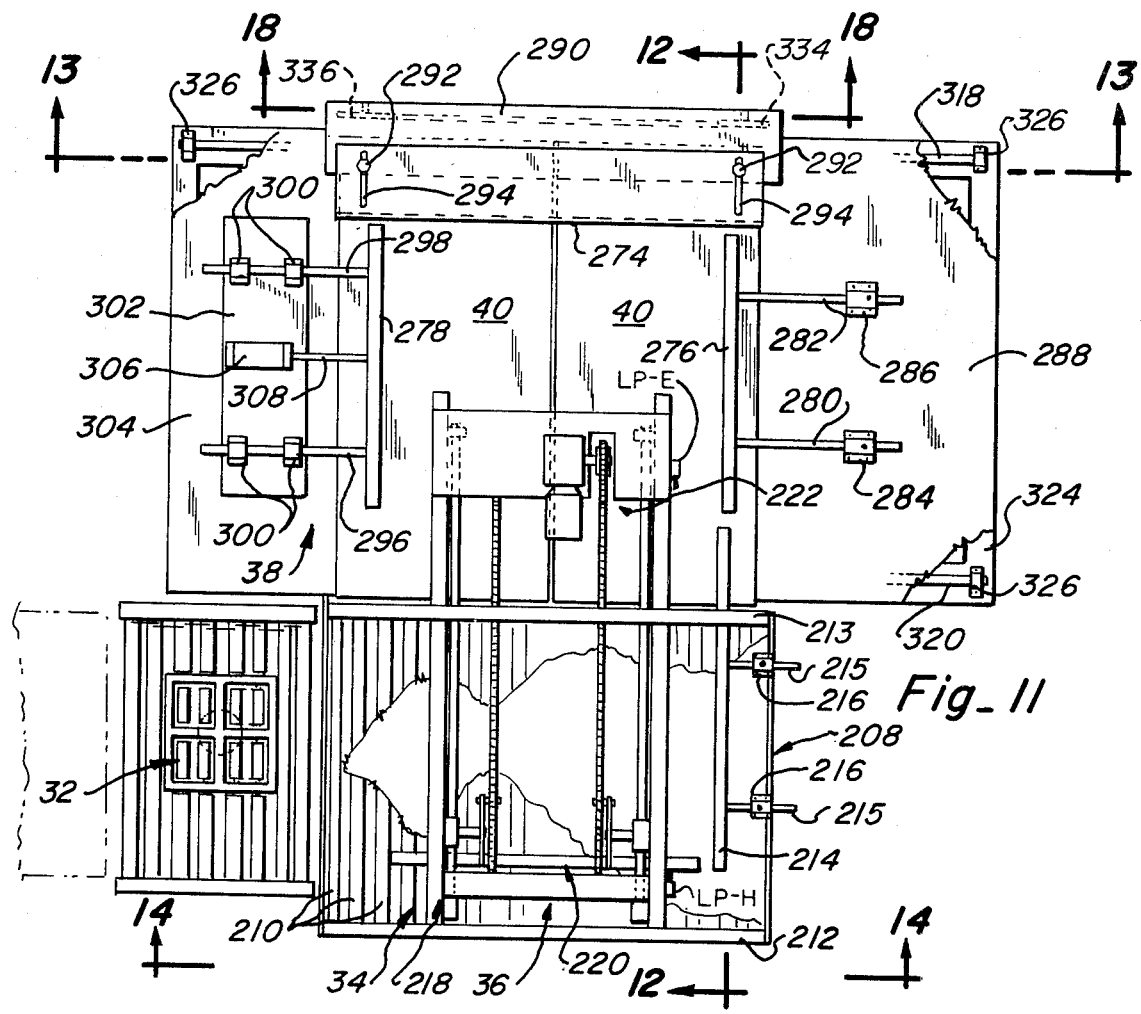
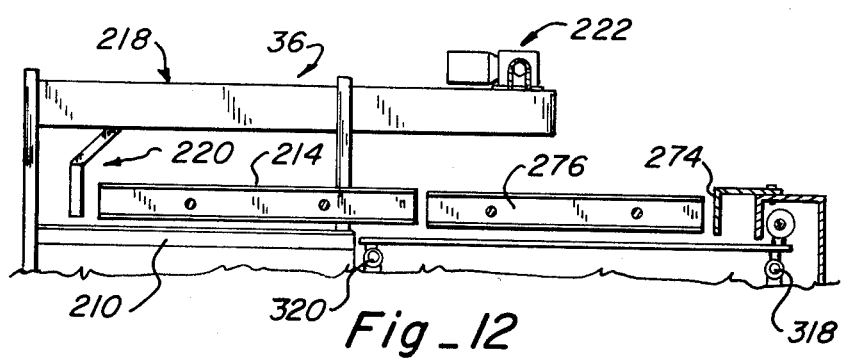
Fig_12
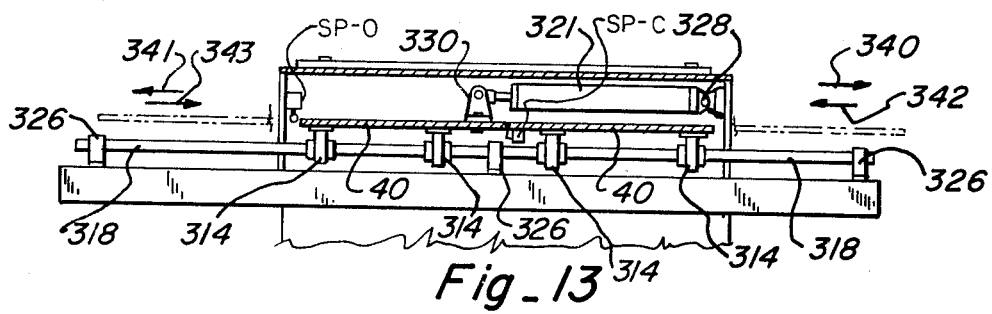
Fig_13

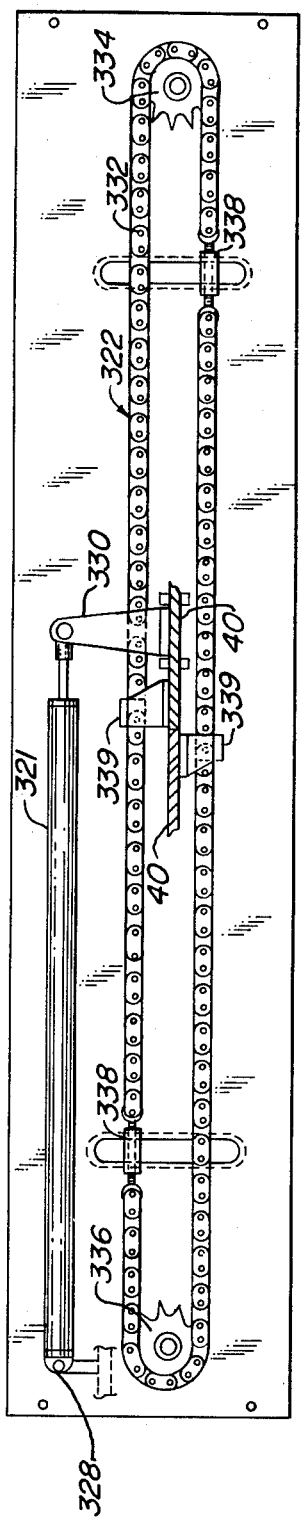
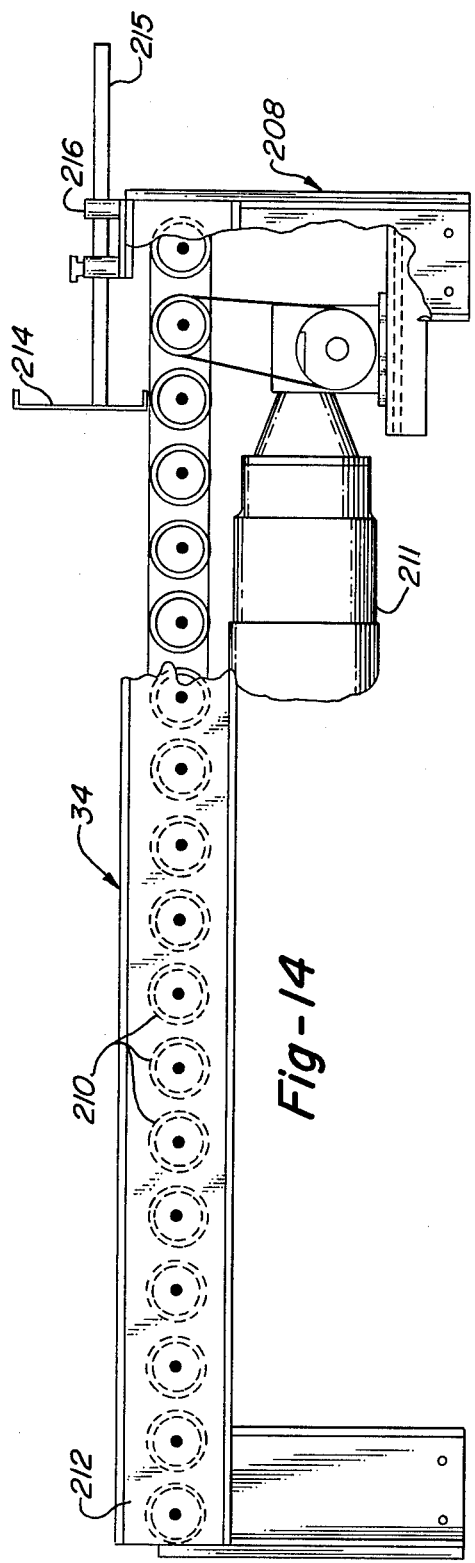
Fig-18
Fig-14

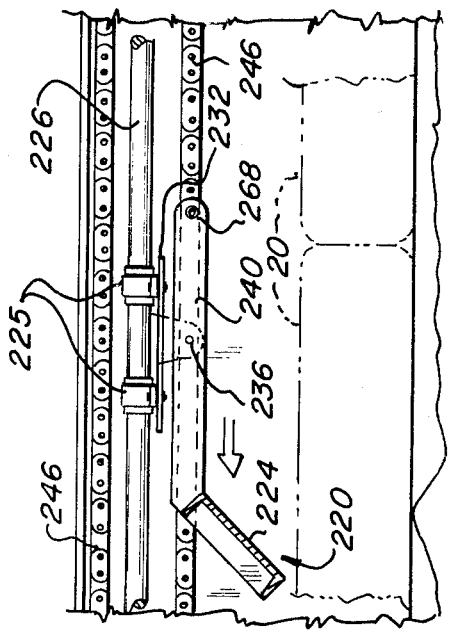
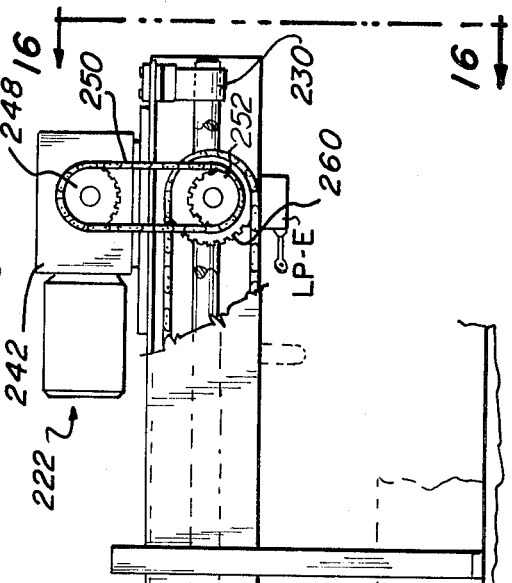
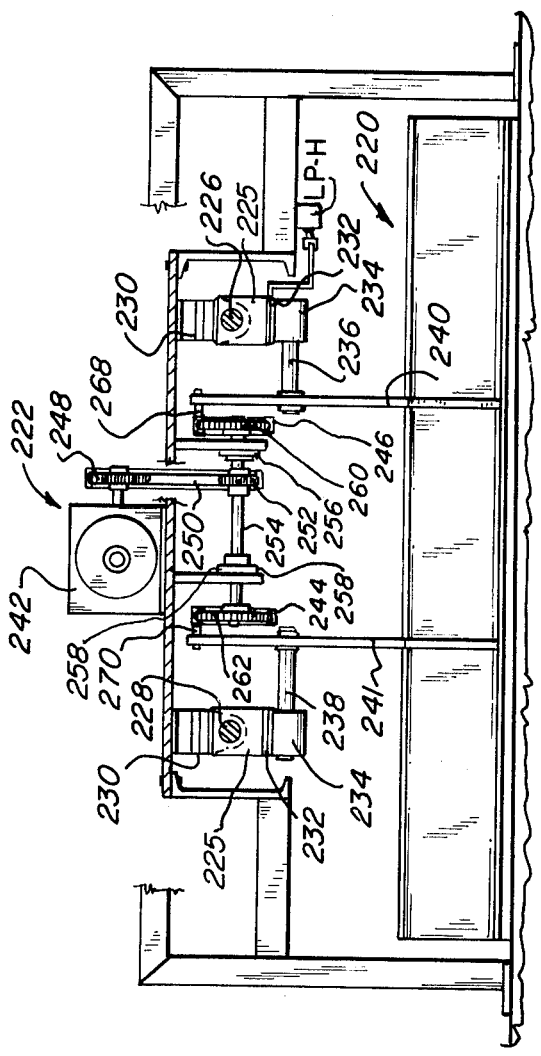

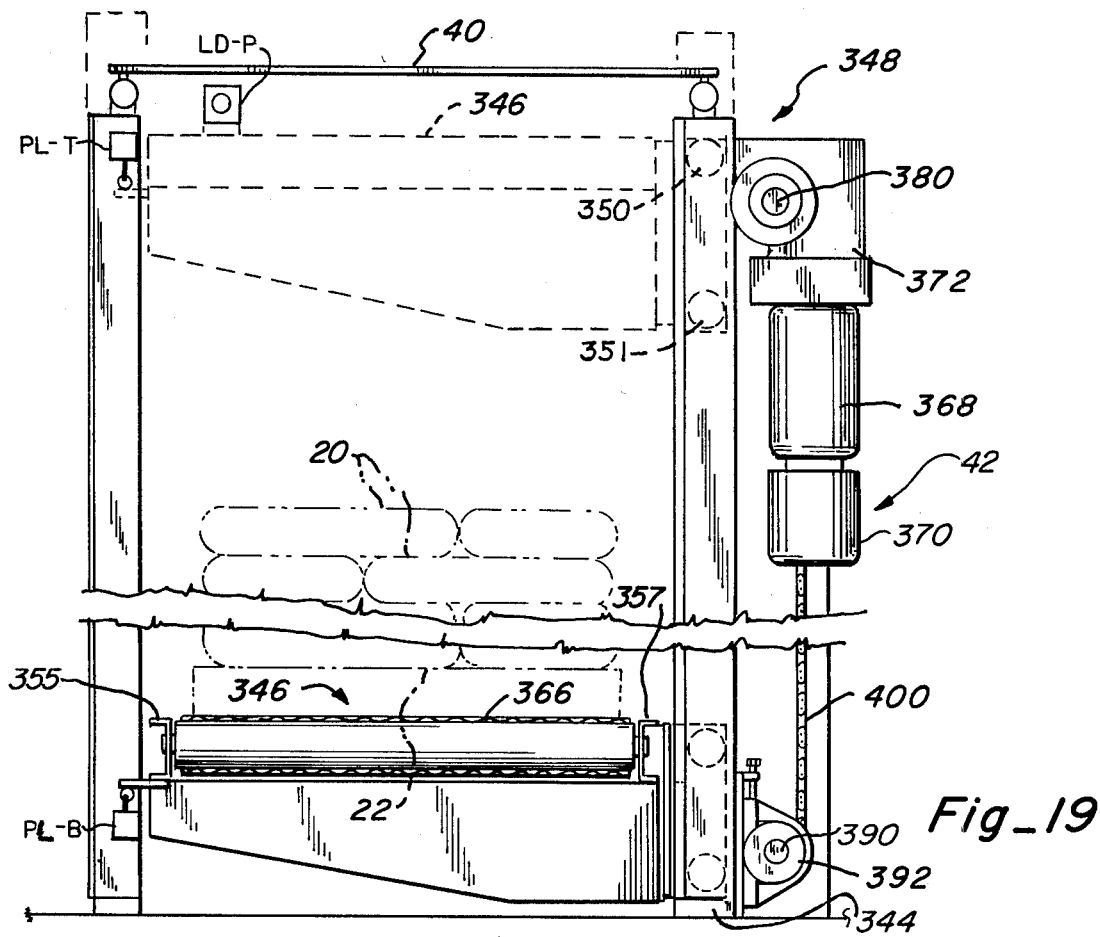
Fig_19
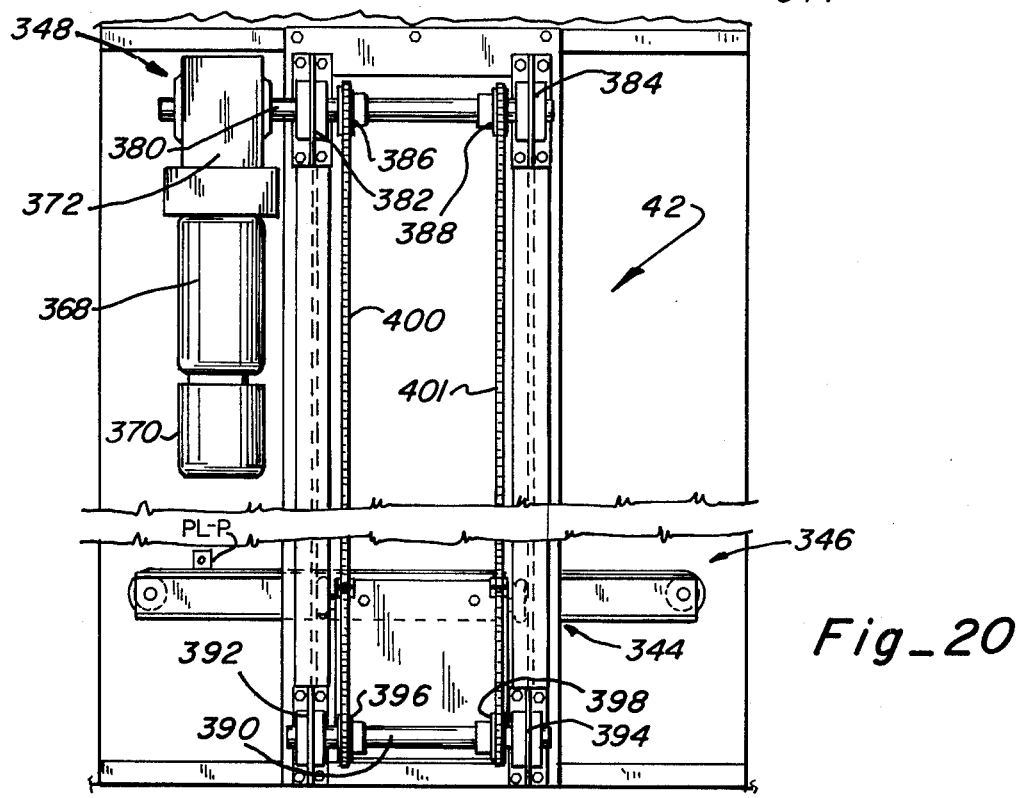
Fig_20

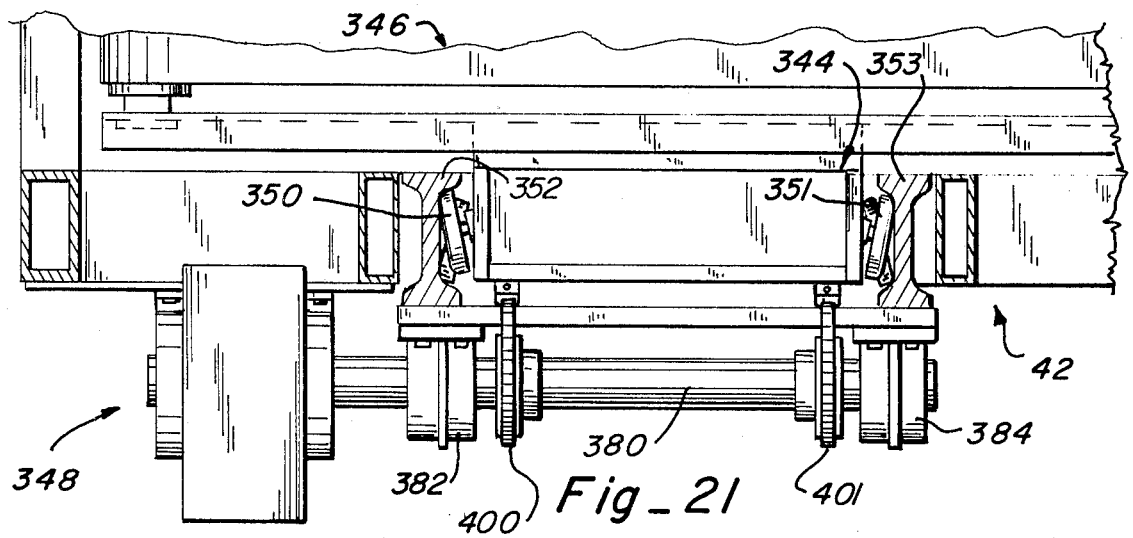
Fig_21
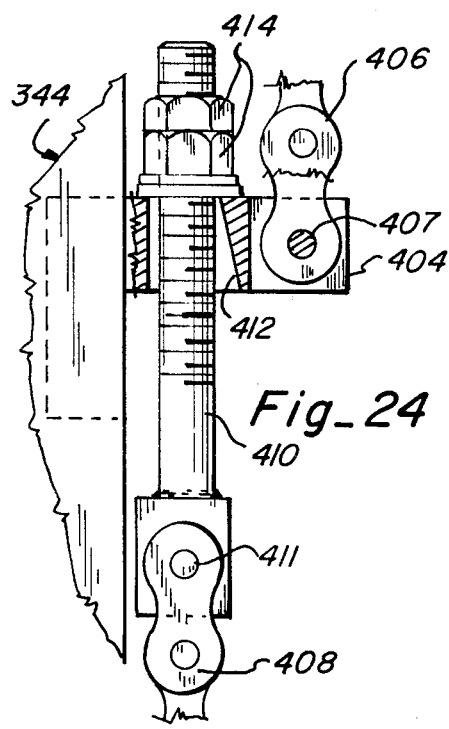
Fig_24
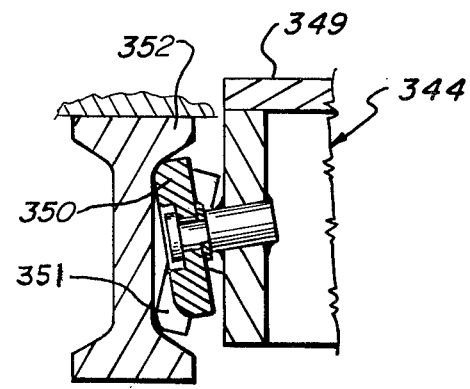
Fig_23
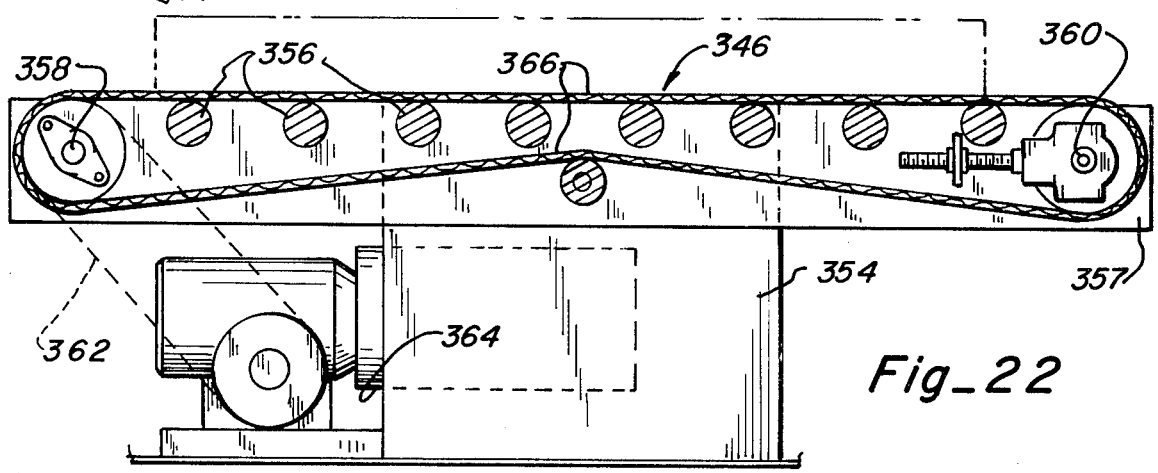
Fig_22

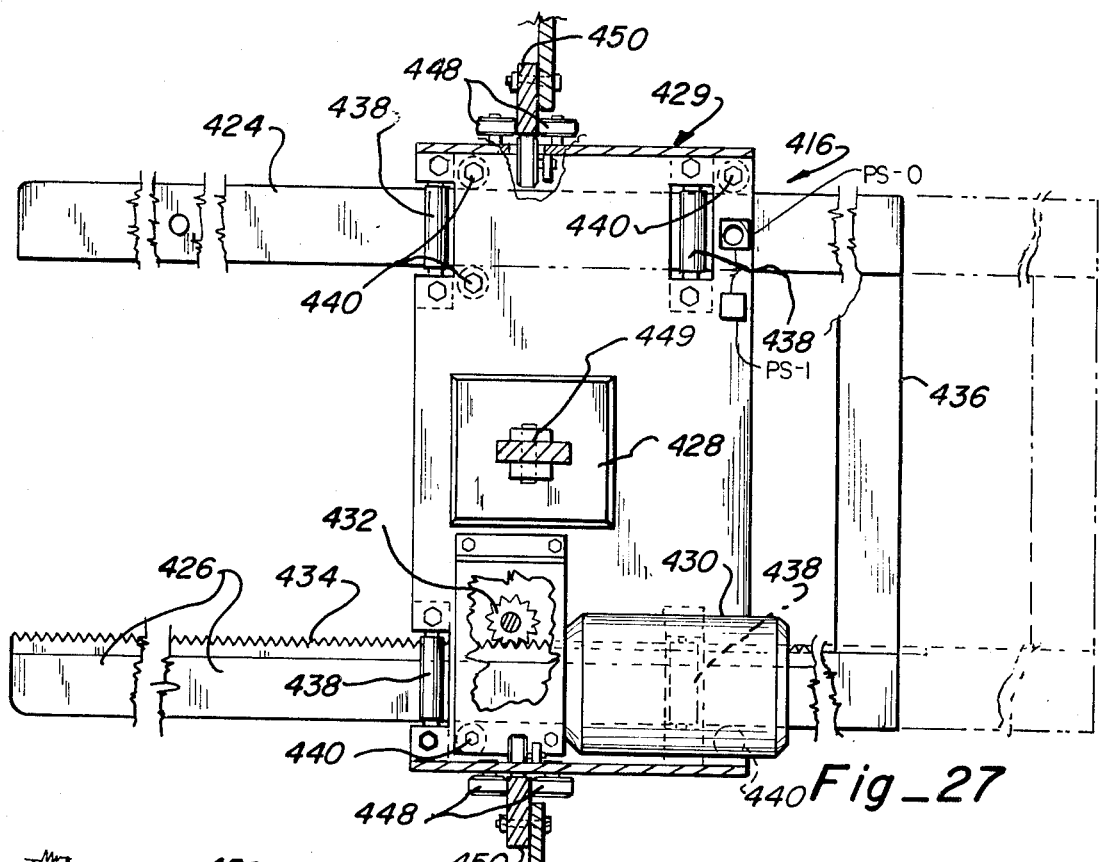
Fig_27
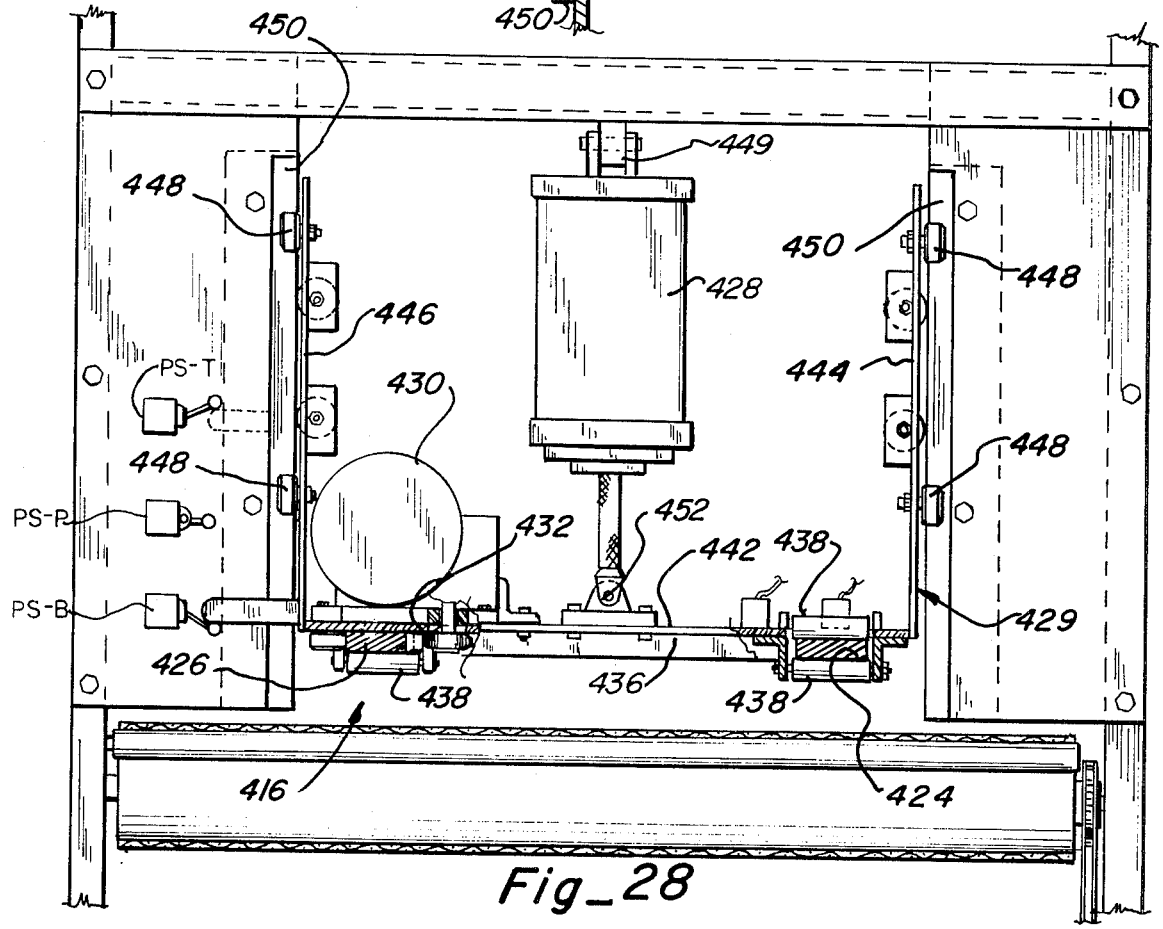
Fig_28

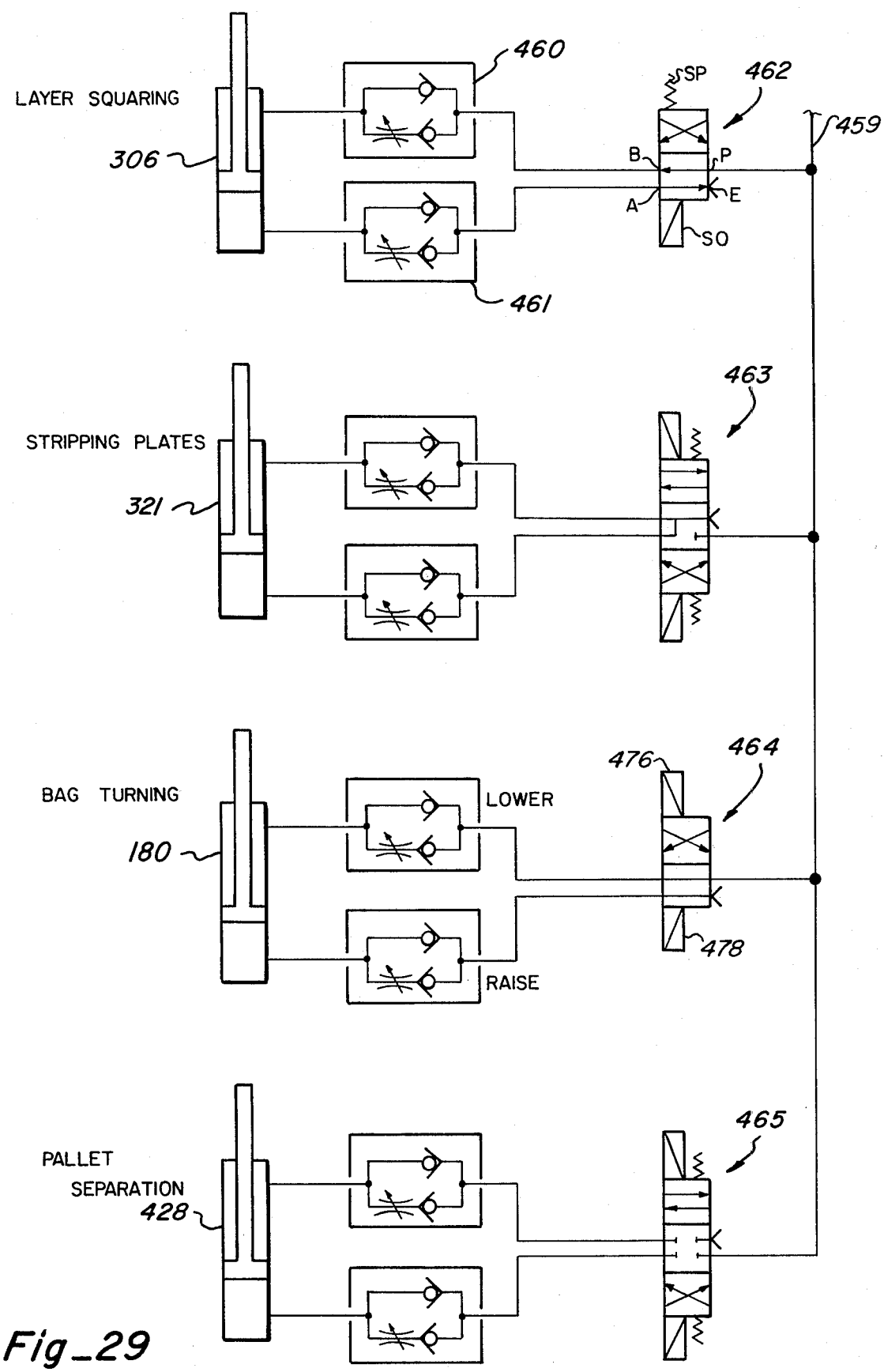
Fig_29

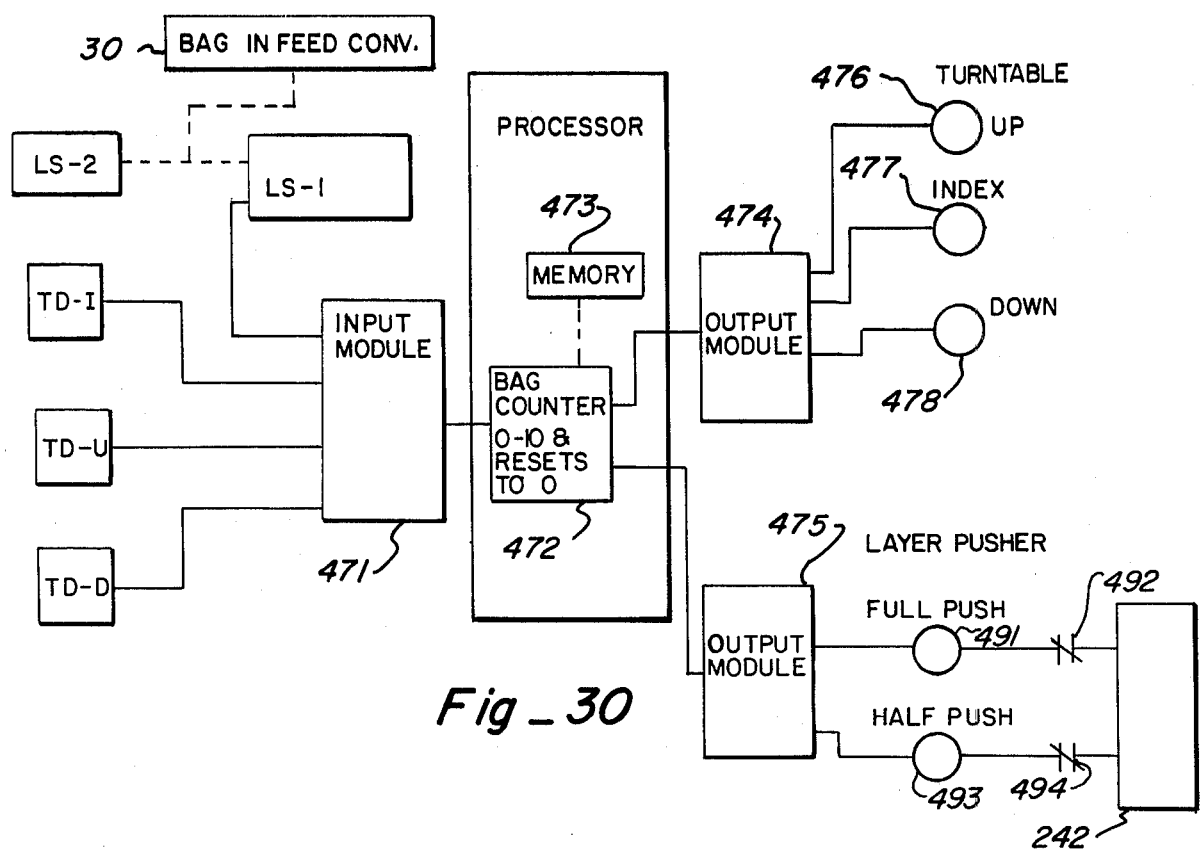
Fig_30
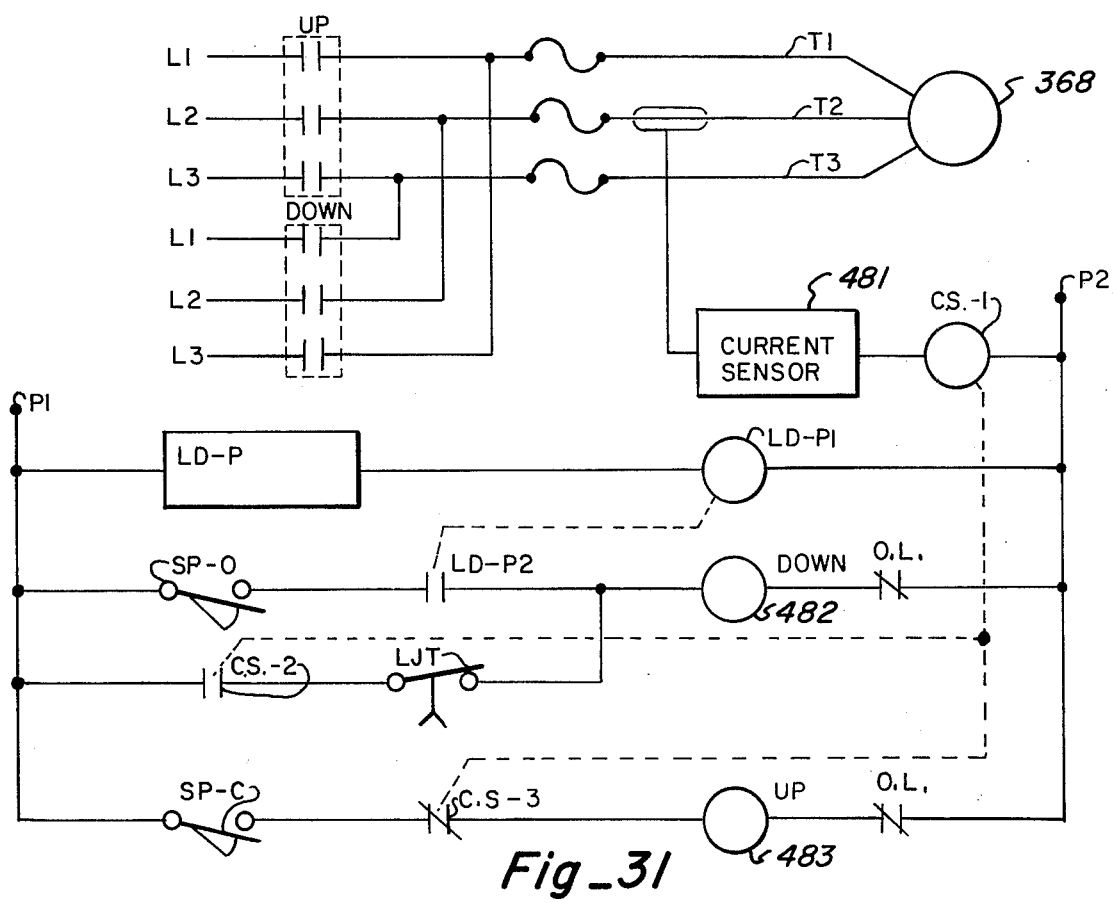
Fig_31

BAG HANDLING APPARATUS

FIELD OF THE INVENTION

The present invention relates to material handling apparatus and more particularly to an automatic palletizer for arranging and stacking bags of material on pallets.

BACKGROUND OF THE INVENTION

Various automated palletizers have heretofore been developed for stacking bags of material or the like on pallets. Generally the bags are conveyed to the palletizer where they are oriented at a loading area to form a single layer of bags in a desired pattern. The formed layer pattern is then generally squared and transferred to stripper or draw plates which are separable for depositing the layer of bags onto an elevated pallet located below the stripper plates on a pallet elevator. The elevated pallet is then lowered in increments by the pallet elevator as the bags are continuously stacked in layers of alternating patterns until a full pallet load is obtained.

The present invention is directed to a palletizer of this type that is simple to operate and suitable for palletizing a variety of bag sizes. In addition, the palletizer of the present invention is provided with improved apparatus for flattening the bags, for orienting the bags into tight patterns for stacking, and for depositing and compressing layers of alternating patterns on the pallet.

Accordingly, it is an object of the present invention to provide an automatic bag palletizer for stacking bags of material or the like on pallets.

Another object of the present invention is to provide improved apparatus for flattening the material within the bags prior to palletizing.

A further object of the present invention is to provide an automatic bag palletizer capable of palletizing different sized bags and characterized by improved apparatus for orienting the bags, for squaring the oriented bags into a layer of a desired pattern, for depositing the formed layer onto a pallet, and for compressing the stacked bag layers on the pallet.

Yet another object of the present invention is to provide an automatic bag palletizer of a low-cost construction that is simple to operate.

SUMMARY OF THE INVENTION

Bag handling apparatus includes a bag palletizer for arranging and stacking bags of material on pallets. The bag palletizer has a section of infeed conveyor for metering the bags at a controlled rate onto a bag turner apparatus. A photoelectric device counts the bags and the bag turner is programmed to rotate the bags, depending on the count, either 90°, 180° or 270° for forming selected ones of a multiplicity of layer patterns. The oriented bags are formed in the layer patterns on a live roller conveyor load table located downstream from the bag turner. A bag pusher is provided for transferring the layer pattern from the load table onto a set of stripper plates which are separable for depositing the layer pattern of bags onto a pallet situated on a pallet elevator below the stripper plates. A layer squarer squares and compacts the layer pattern on the stripper plates before the bags are deposited onto the pallet. Once deposited onto the pallet by separation of the stripper plates, the stripper plates are closed and the elevator raises the pallet for compressing the newly formed layer of bags against the closed stripper plates. The motor current of the elevator motor is utilized to accomplish substantially uniform compression for each layer. Alternating layer patterns are stacked onto the pallet until a full pallet is obtained. Once a pallet has been loaded, the full pallet is lowered and conveyed to a full pallet roller conveyor where it can be removed by a fork truck or the like. A pallet magazine is provided for stacking a supply of empty pallets for loading. A pallet separation mechanism and empty pallet conveyor coupled to the pallet magazine feed the pallets one at a time as required from the magazine into the pallet elevator for loading.

A novel bag flattener apparatus is provided for flattening and evenly distributing the material in the bags prior to palletizing. The bag flattener includes a lower conveyor run and a parallel spaced upper conveyor run traveling at the same speed to convey bags therebetween. The upper conveyor run is movably mounted on a parallelogram linkage attached to the lower conveyor run such that, as the bags are conveyed between the two conveyor runs, the bags are flattened by the weight of the upper conveyor run against the lower conveyor run.

Other objects, advantages and capabilities of the present invention will become more apparent as the description proceeds, taken in conjunction with the accompanying drawings in which like parts have similar reference numerals and in which:

FIG. 1 is a perspective view, partially cut away and with parts removed, of an automatic bag palletizer constructed in accordance with the present invention;

FIG. 2 is a schematic side elevation view of an automatic bag palletizer and bag flattener constructed in accordance with the present invention and of an opposite hand configuration to the palletizer shown in FIG. 1;

FIG. 3 is a plan view with parts removed of an automatic bag palletizer constructed in accordance with the invention of an opposite hand configuration to the palletizer shown in FIG. 1;

FIG. 4 is a plan view of a pattern arrangement for a layer of bags;

FIG. 4a is a plan view of a pattern arrangement for an alternating layer of bags;

FIG. 5 is a side elevation view along section line 5—5 of FIG. 3 showing the bag flattener apparatus and infeed conveyor for the palletizer shown in FIG. 3;

FIG. 6 is a plan view of FIG. 5;

FIG. 7 is a schematic diagram of a pneumatic circuit for operating the bag flattener shown in FIG. 5;

FIG. 8 is an enlarged plan view of the bag turner apparatus for the palletizer shown in FIG. 3;

FIG. 9 is an enlarged front elevation view, partly cut away, along section line 9—9 of FIG. 8;

FIG. 10 is a side elevation view of FIG. 9;

FIG. 11 is an enlarged partial top plan view of the palletizer shown in FIG. 3;

FIG. 12 is a cross-sectional elevation view along section line 12—12 of FIG. 11;

FIG. 13 is a cross-sectional elevation view along section line 13—13 of FIG. 11;

FIG. 14 is a front elevation view along section line 14—14 of FIG. 11;

FIG. 15 is a side elevation view, partly cut away, of a portion of FIG. 11 showing the layer pusher for the palletizer shown in FIG. 3;

FIG. 16 is a cross-sectional elevation view along section line 16—16 of FIG. 15;

FIG. 17 is a partial side elevation view of the layer pusher showing the pusher bar in an up position;

FIG. 18 is a side elevation view along section line 18—18 of FIG. 11 of the chain drive arrangement of the stripper plates for the palletizer shown in FIG. 3;

FIG. 19 is a side elevation view, with parts removed, of the pallet elevator for the palletizer shown in FIG. 3;

FIG. 20 is a back elevation view, with parts removed, of the pallet elevator shown in FIG. 1;

FIG. 21 is a top plan view of FIG. 20;

FIG. 22 is a side elevation view of the wire mesh conveyor section for the pallet elevator shown in FIG. 19;

FIG. 23 is a partial enlarged plan view of the elevator carriage assembly for the pallet elevator shown in FIG. 19;

FIG. 24 is an elevation view showing the attachment of the drive chain to the elevator carriage for the pallet elevator shown in FIG. 19;

FIG. 27 is an enlarged plan view, partially cut away, of the pallet dispenser mechanism for the pallet magazine shown in FIG. 25;

FIG. 28 is a side elevation view of FIG. 27;

FIG. 29 is a schematic diagram showing controls for the pneumatic cylinders;

FIG. 30 is a schematic diagram showing controls for the turntable and the pusher; and FIG. 31 is a schematic diagram showing controls for the elevator motor for accomplishing layer compression and a jog cycle.

DETAILED DESCRIPTION OF THE INVENTION

Figure 26:
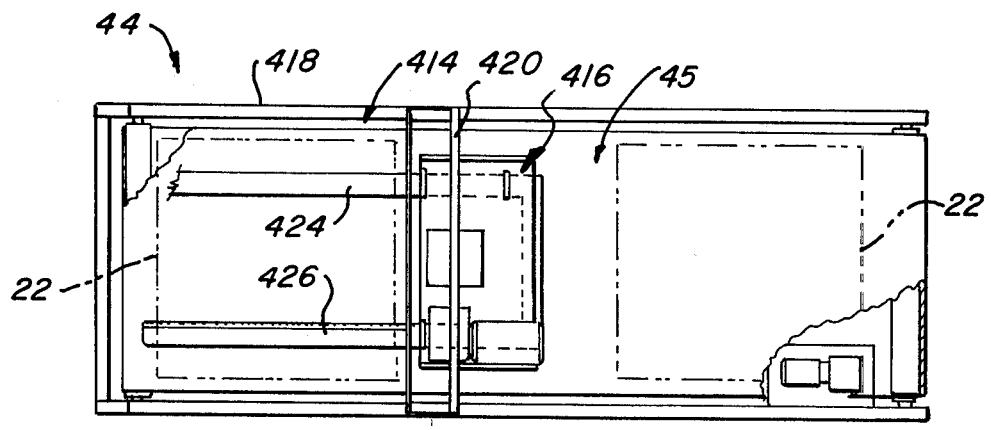
FIG. 26 is a plan view of FIG. 25.

Referring now to FIG. 1, a bag palletizer constructed in accordance with the present invention for palletizing individual bags of material 20 onto wooden pallets 22 or the like is shown and generally designated as 24. The bags 20 may contain any material suitable for packaging in bags, such as for example sand, cement, salt, granulated plastics, gypsum or the like. A pallet load 26 of bags 20 formed by the palletizer 24 is shown discharging from the palletizer and comprises a plurality of bags 20 arranged in five-bag layers of predetermined alternating patterns stacked onto the pallet 22.

In the form of the invention shown, each stacked layer comprises five bags 20. Alternatively, the palletizer may be operated to stack bags in layers of any desired number of bags. Depending on the size of the bags, typical layer patterns of three, four, six, seven, and eight bags can also be utilized. The bag orientation of a layer of bags 20 is shown in FIG. 4. The layer pattern shown comprises a first row 26 of three bags 20, numbered 1, 2 and 3, lined together side by side and a second row 28 of two bags 20, numbered 4, and 5, butted together end to end and lined against the first row 26 of bags to form a pattern having a generally rectangular peripheral configuration. During forming and stacking of the layers by the palletizer, bags are arranged in two alternating patterns, with the layer pattern shown in FIG. 4 being reversed to the pattern shown in FIG. 4a on every other layer. The parting surfaces between adjacent bags on each layer are thus staggered, as shown in the loaded pallet in FIG. 1, to help stabilize the loaded pallet and form a locked load.

Referring again to FIG. 1, the bag palletizer 24 of the invention is shown and, generally stated, comprises an infeed conveyor 30 for transporting the bags 20 to the palletizer, a bag turner 32 for turning the bags 90°, 180° or 270° for orienting the bags 20 for arranging a layer pattern, a load table 34 on which the layer patterns are formed, a layer pusher 36 for transferring the layer pattern from the load table 34 to a stripping area, a layer squarer 38 for squaring and compacting the formed layers, a set of stripper plates 40 for depositing the formed layers of bags 20 onto the pallets 22, a pallet elevator 42 for raising and incrementally lowering the pallets 22 below the stripper plates 40 as the bags are stacked, an empty pallet magazine 44 and conveyor 45 for feeding empty pallets one at a time to the elevator 42, and a full pallet conveyor 46 for conveying the loaded pallets away from the elevator. In addition, in the form of the invention shown the palletizer 24 is provided with a bag flattener 48 (FIGS. 2 and 3) coupled to the infeed conveyor 30 for flattening and evenly distributing the material in the bags prior to palletizing.

In operation the full bags 20 of material are first loaded or conveyed onto the bag flattener 48 where the material is evenly distributed within the bags and the air compressed out of the bags 20. The infeed conveyor 30 then meters the flattened bags onto the bag turner 32 at a controlled rate. A control circuit which includes photoelectric devices for counting the bags at the infeed conveyor automatically operates the bag turner 32 to turn the bags either 90°, 180°, or 270°, depending on the bag count, to orient the bags for forming a layer pattern. From the bag turner 32 the oriented bags are deposited onto the load table 34 where the layer pattern is formed. The formed layer is then pushed in two increments from the load table 34 by the layer pusher 36 onto the stripper plates 40.

When a completed layer pattern has been transferred to the stripper plates 40 the layer squarer 38 squares and compacts the layer pattern and the stripper plates 40 separate for depositing the bags onto the pallet 22. The stripper plates 40 then close and the pallet elevator 42 raises the loaded pallet to momentarily compress the newly formed top layer against the bottom of the closed stripper plates 40. The partially loaded pallet is then lowered by the pallet elevator 42 to be in position to accept the next layer of bags.

The bags are continuously loaded in alternating layer patterns on the pallet until a full pallet is obtained. When the full pallet load is formed the loaded pallet is lowered and conveyed from the elevator assembly 42 onto the full pallet conveyor 46 to be removed by a fork truck or the like. A new empty pallet 22, previously separated and conveyed out of the empty pallet magazine 44 by the empty pallet conveyor 45 into a ready position, is then conveyed onto the pallet elevator 42 for loading.

FLATTENER AND INFEED

Referring now to FIGS. 5 and 6, the bag flattener 48 and infeed conveyor 30 for the palletizer 24 are shown. The bag flattener 48 is located upstream from the infeed conveyor 30 and, generally stated, comprises a stationary lower conveyor run 50 coupled to the infeed conveyor 30, a movable upper conveyor run 52 mounted on a parallelogram linkage assembly 54 to the lower conveyor run 50 for flattening the bags 20 against the lower conveyor run 50, and adjustment means 56 (FIG. 5) for adjusting and maintaining the position of the upper conveyor run 52 with respect to the lower conveyor run 50.

The lower conveyor run 50 of the bag flattener is a conventional electrically powered belt conveyor. The lower conveyor run 50 includes a pair of parallel spaced channel-shaped support rails 58 and 60 and a plurality of idler rollers 62 and an end roller 64 freely rotatably mounted on the rails 58 and 60. A drive roller 65 is located at the head end of the conveyor run 50. The conveyor belt 66 is trained over the drive roller 65, idler rollers 62, and end roller 64 for rotation over the rollers. An electric drive motor and reducer 68 are coupled to the drive roller 65 for rotating the drive roller 65 for driving the conveyor belt 66. The entire lower conveyor run 50, except for the drive end, is mounted in an inclined position supported by a plurality of support legs 70, 72 and 74. A conventional conveyor belt take-up device 76 is provided for tensioning the conveyor belt 66. The conveyor belt 66 may be conventional rubber belting or the like having a rough gripping surface for conveying the bags up the incline of the conveyor run.

The upper conveyor run 52 of the bag flattener 48 is also a conventional belt conveyor substantially identical in construction to the lower conveyor run 50. The upper conveyor run 52 includes a pair of parallel spaced channel-shaped support rails 76 and 78 on which a plurality of idler rollers 80 along with a combination end and belt take-up roller 82 are freely rotatably mounted. A drive roller 84 is located at the head end of the conveyor run and is coupled to another electric drive motor and reducer 86. An endless conveyor belt 87 is trained over the drive roller 84, idler rollers 80, and end roller 82 for rotation by the drive roller 84. Conveyor belt 87 is also provided with a rough gripping surface for conveying the bags up the incline.

As shown in FIG. 5, the upper conveyor run 52 is mounted parallel to the lower conveyor run 50 spaced a distance from the lower conveyor run 50 for conveying the bags therebetween. Both of the conveyor belts 66 and 87 are operated at the same speed. The direction of motion of the conveyed bags is indicated by arrow 88. The end roller section 82 of the upper conveyor run is angled outwardly with respect to the upper 52 and lower 50 conveyor runs to provide a larger inlet opening for passing the bags between the two sections of conveyor.

The parallelogram linkage assembly 54 for mounting the upper conveyor run 52 to the lower conveyor run 50 includes four link bars 90, 92, 94 and 96 fixedly attached to four shafts 98, 100, 102 and 104 which are pivotally mounted to the conveyor runs. Shafts 98 and 100 are pivotally attached to the lower run 50, and shafts 102 and 104 are pivotally attached to upper conveyor run 52. Each link bar 90, 92, 94 and 96 is mechanically affixed to the shafts 98, 100, 102 and 104.

Shaft 98 is pivotally attached to the support rails 58 and 60 of the lower conveyor run 50 on pairs of pillow block ball bearings or the like (not shown) attached to the support rails. Shaft 100 is likewise pivotally attached to the lower conveyor run 50 on pillow block roller bearings attached to support rails and is fixedly attached to link bars 94 and 96. Shafts 102 and 104 are pivotally attached to the upper conveyor run 52 on pillow block bearings parallel to and axially laterally spaced upstream from shafts 98 and 100 in the same manner as shafts 98 and 100 above described. With this arrangement the upper conveyor run 52 is pivotable with respect to the lower conveyor run, as indicated by double-headed arrow 108 in FIG. 5.

As will hereinafter be explained, with this arrangement the upper conveyor run 52 may be positioned with respect to the lower conveyor run 50 such that a bag of material 20 may be conveyed between the two conveyors and flattened by the weight of the pivotable upper conveyor run 52 against the lower conveyor run 50.

The adjustment means 56 (FIG. 5) for adjusting the maintaining the position of the upper conveyor run 52 with respect to the lower conveyor run 50 for flattening the bags includes a stationary support member 110 (FIG. 5) attached to lower conveyor run 50, a movable support member 112 attached to link bars 94 and 96 of the parallelogram linkage 54, and bias means 113 mounted between the stationary 110 and movable 112 support members.

Stationary support member 110 extends across the entire width of the lower conveyor run 50 and is mounted on vertical supports 114 attached to the conveyor support rails 58 and 60. Likewise, movable support member 112 extends across the entire width of the lower conveyor run and is attached at both ends to vertical supports 116 attached to link bars 94 and 96 of the parallelogram linkage 54.

The bias means 113 is mounted between the stationary 110 and movable 112 supports and provides a biasing force for separating and positioning the stationary 110 and movable 112 supports and thus the lower 50 and upper 52 conveyor runs relative to one another. In one form of the invention the bias means 113 comprises one or more conventional pneumatic actuators 117 mounted to the stationary support 110 in position to abut the movable support 112 upon actuation. A suitable air actuator 117 for use with this arrangement is Air Actuator #116 manufactured by the Firestone Company. With an air actuator bias means the air actuators 117 may be charged with compressed air at a certain pressure to resist the weight of the upper conveyor run 52 and maintain the upper conveyor run 52 at a desired spacing with respect to the lower conveyor run.

A pneumatic circuit 118 for operating the air actuators 117 is shown in FIG. 7. In the pneumatic circuit shown, compressed air is taken from an air supply, filtered through a filter unit 119, and then regulated by a regulator 120 to a desired pressure. Airflow to the air actuators 117 is controlled by a four-way control valve 122. A pilot-operated check valve 124 is coupled between the air actuators 117 and control valve 122.

In operation the control valve 122 can be shifted initially for charging the actuators 117 with compressed air. The check valve 124 is set up to prevent airflow out of the actuators 117 and the actuators may be continuously operated with the initial charge of compressed air. For venting the actuators 117 the control valve may be shifted for directing air through the pilot-operated check valve 124 for shifting the check valve 124 to allow airflow through the check valve 124 and through the control valve 122 to atmosphere.

Increasing the air pressure within the air actuators 117 by adjusting the volume of air in the actuator tends to increase the separation of the upper conveyor run 52 with respect to the lower conveyor run 50. Decreasing the air pressure tends to decrease the separation distance. The air pressure within the actuator may thus be set such that the upper conveyor run 52 and lower conveyor run 50 are separated by a distance slightly less than the thickness of the bags of material 20 to be palletized. A bag 20 may thus enter between the conveyors and be compressed by the weight of the upper conveyor run 52 as it is conveyed upward. In addition to the weight of the conveyor and the rolling action of the idler rollers 62 and 80 on the bags 20, the incline of the conveyor helps to displace and evenly distribute the material within the bags. The bag flattener is therefore relatively simple from a mechanical standpoint and is easily adjustable to a variety of bag widths and thicknesses.

Referring again to FIGS. 5 and 6, the infeed conveyor 30 for the palletizer 24 is shown. The infeed conveyor 30 is coupled to the lower conveyor run 50 of the bag flattener 48 and includes a section of gravity roller conveyor 126 and a powered metering section of conveyor 128. The gravity roller conveyor 126 is a conventional roller conveyor having a pair of channel-shaped support rails 130 and 132 which are attached to the support rails of the lower conveyor run 50 of the bag flattener 48. A plurality of rollers 136 are freely rotatably mounted to the support rails 130 and 132. The gravity roller conveyor 126 is mounted on a decline to allow the bags to move by gravity over the rollers 136. A normally open, light energized photoeye LS-3 is mounted at the upstream end of conveyor 30 to detect when this conveyor is full of bags.

The metering section of conveyor 128 for the palletizer 24 is coupled to the gravity roller conveyor 126 and includes a pair of channel-shaped support rails 136 and 138, a freely rotatably mounted end roller 140, a drive roller 142 coupled to an electric motor and reducer 144, and a section of endless conveyor belting 146 having a rough surface trained over the end roller 140 and drive roller 142. The metering section 128 is mounted on a pair of support legs 148 and struts 150. As will hereinafter be explained, the metering section of conveyor 128 can be stopped and started as required to inventory a quantity of bags 20 on the gravity roller section 126 and meter the bags into the palletizer 24 one at a time at a controlled rate. A normally open dark-energized photoeye LS-2 is mounted at the downstream end of conveyor 128 to detect a bag approaching the bag turner.

BAG TURNER

Referring now to FIGS. 8, 9 and 10, the bag turner 32 for orienting the bags in the proper positions for forming the layer patterns is shown. Generally stated, the bag turner 32 comprises a live roller conveyor section 152, a turntable 154 for turning the bags 20, and drive means 156 (FIG. 9) for lifting and rotating the turntable 154 and bags 20. During operation of the turner 32 the bags 20 are metered onto live roller conveyor section 152 by the infeed conveyor 30. The live roller conveyor 152 then moves the bags onto the turntable 154. When a bag is in position on the turntable 154, the turntable drive means 156 is actuated for lifting the turntable and bag above the live roller conveyor 152 and then for turning the turntable 90°, 180° or 270° as programmed to orient the bag in the proper position. Once the bag is properly oriented, the drive means 156 is actuated for lowering the turntable 154 and the bag is deposited onto the live roller conveyor 152 and moved onto the palletizer load table 34.

The live roller conveyor 152 for the turner 32 is mounted on a rigid support frame 153. The support frame 153 includes a pair of channel-shaped support rails 157 and 158 on which a plurality of parallel spaced cylindrical rollers 160 for the conveyor are mounted. The rollers 160 are rotatably mounted on bearings 162 attached to the rails 157 and 158. Each roller 160 has two chain sprockets 164 attached at one end for drivably connecting all of the rollers together utilizing endless sections of roller chains 166 trained over sprockets 164 on adjacent rollers. As shown in FIG. 10, two of the rollers 160 are drivably coupled to another endless section of roller chain 166 to the output of an electric drive motor and reducer 168. All of the rollers 160 are thus coupled for rotation by the electric drive motor and reducer 168 in the direction indicated by arrows 170.

The turntable 154 is a grid-like device having a generally square outer peripheral portion 154a and cross-shaped center portion 154b. The turntable 154 may be formed from metal bars welded together to form the solid structure. As shown in FIG. 8, the middle four rollers 160 of the live roller conveyor 152 are formed with reduced diameter grooved portions 172 wherein the turntable is situated in its down position. A cylindrical collar 176 (FIG. 9) having an interior through bore 178 is attached to the turntable 154 for coupling the turntable to an output shaft of the turner drive means 156. A normally open dark-energized photoeye LS-1 is located on the center line of the turning device to detect bags thereon and also to count bags.

As shown in FIG. 9, the drive means 156 for the turntable 154 includes a combination linear and rotary motion actuator 180 that is coupled to a pneumatic control circuit described hereinafter for up-and-down motion and to an indexing mechanical drive train 182 for rotary motion. The combination actuator 180 may be a conventional hydraulic linear and rotary motion actuator which may be modified for being mechanically rather than hydraulically rotated in 90-degree increments. In the form of the invention shown, the combination actuator 180 is the linear portion of a P.H.D #MA11B actuator. The cylinder rod 184 of the stock P.H.D. actuator 180 may be lengthened for coupling the rod to the mechanical drive train 182.

As shown in FIG. 9, the mechanical drive train 182 for the combination actuator 180 generally comprises an electric motor and reducer 186 coupled through a wrap spring clutch-brake unit 188 to the cylinder rod 184 of the combination actuator 180. The clutch-brake unit 188 is conventional electrically operated indexing clutch-brake having an indexing electric solenoid 477 which is electrically energized to release the brake for engaging the clutch to allow a 90-, 180-, or 270-degree output. In the form of the invention shown, a Warner-Clutch Brake #CB-10 Part #3-10-1-1-1-01-04-11 is utilized.

The output shaft 190 from the clutch-brake 188 is coupled to the cylinder rod 184 of the combination actuator 180 and is supported on bearings 192 and 194 attached to the support frame 153 of the bag turner 32. A drive sprocket 196 is attached to the input hub 198 of the clutch-brake 188 utilizing hex head capscrews 202 mounted on cylindrical hollow spacers 200. Drive sprocket 196 is drivably coupled through an endless length of roller chain 204 to another chain sprocket 205 keyed to the output shaft of the electric motor and reducer 186.

With this arrangement there is no output from the output shaft 190 of the clutch-brake until the indexing solenoid of the clutch-brake 188 is energized for releasing the brake and engaging the clutch. With the clutch engaged the output shaft 190 will rotate 90°, 180°, or 270° as required to turn the turntable 154 and bag 20. Before indexing the turntable 154, however, the combination actuator 180 is pneumatically operated for raising the turntable above the rollers 160 of the live roller conveyor 152. Once the turntable 154 has been indexed in a desired degree increment, the actuator may be pneumatically operated to lower the turntable back to its lowered position, depositing the oriented bag back onto the live roller conveyor 152 for transport to the next station.

During operation of the bag turner for orienting bags for forming alternating five-bag layer patterns, as shown in FIGS. 4 and 4a, the turntable is set up to rotate the bags in a clockwise direction (looking down). For forming the layer pattern bags Nos. 1, 2 and 3, as labeled in FIG. 4, are turned 90° by the turntable 154. Bag No. 5 is rotated 180° by the turntable 154, and bag No. 4 is allowed to pass over the turntable without being turned. As will hereinafter be explained, for forming the basic layer pattern (FIG. 4) the layer pusher 36 makes pushes after the third and fifth bags.

For forming the alternating layer pattern shown in FIG. 4a, bag No. 7 is rotated 180° by the turntable 154. Bag No. 6 is allowed to pass over the turntable without being rotated, and bags Nos. 8, 9, and 10 are rotated 270° by the turntable. On the alternating layer pattern the layer pusher 36 makes pushes after the seventh and tenth bags. With this turning arrangement, if the bags are all fed into the palletizer with their bottom sides first, all of the bottom sides of the bags will be located along the outer periphery of the formed layer pattern, as depicted schematically with solid lines in FIGS. 4 and 4a.

Alternatively, the bag turner may be programmed for turning bags to form patterns from three, four, six, seven, or eight bags as desired.

A normally open limit switch TD-U senses the turner in the up position. A normally open limit switch TD-D senses the turner in the down position. A normally open limit switch photoeye TD-I senses the turner index complete and causes the de-energization of the index solenoid.

LOAD TABLE AND LAYER PUSHER

Referring now to FIGS. 11 and 14, the load table 34 for the palletizer is shown. The load table 34 is a live roller conveyor that is similar in construction to the live roller conveyor portion 152 of the bag turner 32 previously described. Generally stated, the load table 34 comprises a support frame 208 and a plurality of parallel spaced cylindrical rollers 210 rotatably mounted thereon and drivably coupled to one another and to an electric motor and reducer 211 (FIG. 14).

Each roller 210 is rotatably mounted on bearings (not shown) attached to a pair of channel-shaped support rails 212 and 213 of the load table support frame 208. In addition, each roller 210 is drivably coupled to the adjacent rollers on either side, and one of the rollers 210 is drivably coupled to the electric motor and reducer 211 (FIG. 14) utilizing pairs of chain sprockets and an endless section of roller chains, as previously described in the description of the live roller conveyor 152 for the bag turner 32.

A fixed side plate 214 is mounted to the support frame 208 at one end of the load table for stopping and squaring the bags which are accumulated on the load table. The fixed side plate 214 is attached to mounting rods 215 which are adjustably mounted on support brackets 216 attached to the support frame 208 of the load table.

Referring now to FIGS. 11 and 12, the layer pusher 36 for pushing the layer patterns of bags formed on the load table 34 onto the two stripper plates 40 is shown. Generally stated, the layer pusher comprises a support frame 218 attached to the load table support frame 208 above the load table 34 and two stripper plates 40, a pusher plate 220 movably mounted to the support frame 218 for pushing the bags 20 across the load table 34 to the stripper plates 40, and drive means 222 for moving the pusher bar 220 back and forth from the load table 34 to the stripper plates 40.

As shown in FIGS. 15, 16 and 17, the pusher plate 220 is a generally channel-shaped plate having a flat front surface 224 for pushing the bags 20 across the load table 34 onto the stripper plates 40. The pusher plate 220 is pivotally mounted on two pairs of frictionless linear ball bushings 225 for linear movement along two parallel spaced support shafts 226 and 228 by the drive means 222. The support shafts 226 and 228 extend from end to end across the entire length of the support frame 218 for the layer pusher 36 and are mounted on pairs of shaft support rails 230 attached to the support frame 218. The frictionless linear ball bushings 225 are journaled to the support shafts 226 and 228 for linear movement along the shafts.

Each pair of frictionless ball bushings 225 is attached to one side of a bearing mounting plate 232. Pillow block solid journal bearings 234 are mounted to the opposite side of the bearing mounting plates 232 and two pivot shafts 236 and 238 are journaled to the pillow block solid journal bearings 234. The pivot shafts 236 and 238 in turn are connected to two pivot mounting plates 240 and 241, respectively, which attached to the pusher plate 220. With this arrangement the pusher plate 220 is supported for linear axial movement on the frictionless linear ball bushings 225 along support shafts 226 and 228, and for pivotal movement on the pivot shafts 236 and 238 about the pillow block solid journal bearings 234.

The drive means 222 for the pusher plate 220 includes an electric drive motor with brake and reducer 242 and a pair of endless drive chains 244 and 246 drivably coupled to the drive motor with brake and reducer 242 and pivotally coupled to the pusher plate 220.

As shown in FIG. 16, the drive train from the electric drive motor and reducer 242 to the drive chains 244 and 246 includes a drive sprocket 248 attached to the output shaft of the reducer and a driven sprocket 252 drivably coupled to the drive sprocket 248 by an endless length of roller chain 250 trained over the two sprockets. Driven sprocket 252 is attached to a drive shaft 254 which is rotatably mounted on two roller bearings 256 and 258 attached to the support frame 218 of the layer pusher. In addition, two other chain sprockets 260 and 262 are attached to the drive shaft 254 on either end of the drive shaft 254. The drive chains 244 and 246 for the pusher plate 220 are trained over the end chain sprockets 260 and 262 on drive shaft 254 and over two other idler sprockets 264 (FIG. 15) and 266 (not shown), respectively, which are freely rotatably mounted on shafts at the opposite end of the support frame from end sprockets 260 and 262.

The pivot mounting plates 240 and 241 in turn are pivotally attached to drive chains 244 and 246, respectively. As shown in FIG. 15, pivot mounting plate 240 is pivotally mounted on a connecting pin 268 to drive chain 246. Likewise, pivot mounting plate 241 is pivotally mounted on a connecting pin 270 to drive chain 244.

With this arrangement the pusher plate 220 may be moved by rotation of the drive chains 244 and 246 from one end of the load table across the load table 34 to the stripper plates 40 and then back again. While moving across the load table to the stripper plates 40, the pusher plate 220 is located in a down pushing position, as shown in FIG. 15, with the pivot connecting pins 268 and 270 to the drive chains 244 and 246 traveling along the upper strand of the drive chain loops. When the connecting pins 268 and 270 reach the drive chain sprockets located over the stripper plates 40, however, the pivot connecting pins 268 and 270 rotate with the drive chains 244 and 246 around the drive sprockets 260 and 262 and pivot the pusher plate 220 about pivot shafts 236 and 238 to an up position, as shown in FIG. 17. In the up position the pusher plate 220 will clear the bags which have passed onto the live roller load table. The pusher plate 220 then travels back from the stripper plates 40 over the load table with the pivot connecting pins 268 and 270 traveling along the lower strands of the drive chain 244 and 246 maintaining the pusher plate 220 in an up position. A normally open limit switch LP-H senses the pusher plate in the home position. A normally open limit switch LP-E senses the pusher plate in the extended position and starts the stripper plate cycle.

LAYER SQUARER

Referring again to FIG. 11, the layer squarer 38 for squaring the layer patterns which have been deposited on the stripper plates 40 is shown and comprises a stationary back plate 274 mounted over the stripper plates 40, a stationary side plate 276 mounted over the stripper plates 40 at right angles to back plate 274, and a movable squaring plate 278 movably mounted over the stripper plates 40 opposite and parallel to stationary side plate 276.

The stationary side plate 276 is attached to a pair of mounting shafts 280 and 282 which are adjustably mounted on brackets 284 and 286 attached to the cover plate 288 of the palletizer. The stationary back plate 274 is adjustably mounted to cover plate 290 of the palletizer utilizing threaded fasteners 292 threaded to holes in the cover plate 290 and positioned in slots 294 through the top side of the stationary back plate 274.

The movable squaring plate 278 is a flat plate which is movably attached to the palletizer on two mounting rods 296 and 298. The mounting rods 296 and 298 are journaled to sets of bearings 300 which are mounted on a flat mounting plate 302 attached to cover plate 304 of the palletizer. A pneumatic cylinder 306 is also mounted on the mounting plate 302 and its cylinder rod 308 is attached to the squaring plate 278 for moving the squaring plate 278 in and out relative to the stationary side plate 276 for squaring the layer patterns on the stripper plates 40.

With this layer squarer 38 arrangement a layer of bags on the stripper plates 40 can be squared against the stationary side plate 276 by the movement of the movable squarer plate 278 and against stationary back plate 274 by the movement of the pusher plate 220.

STRIPPER PLATES AND PALLET ELEVATOR

Referring now to FIGS. 11, 13 and 18, the two stripper plates 40 and their drive arrangement are shown. As shown in FIG. 13, the stripper plates 40 are movably mounted on eight frictionless linear ball bushings 314 which are journaled to two parallel spaced support shafts 318 and 320 (FIG. 11) for linear movement therealong. A pneumatic cylinder 321 and a chain drive 322 (FIG. 18) are provided for moving the stripper plates 40 along the support shafts 318 and 320 equal distances and in opposite directions.

The support shafts 318 and 320 for the stripper plates 40 are mounted to the main frame 324 of the palletizer spaced apart and parallel to one another. Shaft support blocks 326 are provided at either end and in the center of both of the support shafts 318 and 320 for mounting the shafts to the frame 324. The linear ball bushings 314 for the stripper plates 40 are journaled to the support shafts 318 and 320, and each stripper plate is attached to four linear ball bushings 314.

The pneumatic cylinder 321 for moving the stripper plates 40 is attached to a first clevis connector 328 to the main palletizer frame, and its cylinder rod is attached to a second clevis connector 330 to one of the stripper plates 40. The two stripper plates 40 are in turn coupled together for equal and opposite motion by the chain drive 322. As shown in FIG. 18, the chain drive 322 comprises an endless strand of roller chain 332 that is trained over two freely rotatable idler sprockets 334 and 336. The idler sprockets 334 and 336 are each freely rotatably mounted to the main frame of the palletizer at opposite sides of the frame. Two turnbuckle-type tensioner blocks 338 are provided for adjusting the tension of the chain 332 and for adjusting the position of the stripper plates with respect to each other.

The top side of one of the stripper plates is attached by a first connector 339 to the top strand of the chain 332 and the bottom side of the other stripper plate 40 is attached by a second connector 339 to the lower strand of the chain. The two stripper plates 40 are thus coupled together for equal and opposite motion upon rotation of the chain 332. Extension of pneumatic cylinder 321 rotates the chain 332 and moves the stripper plates 40 outward from one another, as indicated by arrows 340 and 341 in FIG. 13, for opening the plates and depositing a layer of bags onto a pallet. Retraction of the pneumatic cylinder 321, on the other hand, rotates the chain 332 in the opposite direction and moves the stripper plates 40 together, as indicated by arrows 342 and 343. A normally open limit switch SP-O is positioned to sense the stripper plates in the open position. A normally open limit switch SP-C senses the stripper plates in the closed position.

Referring now to FIGS. 19 through 24, the pallet elevator 42 is shown. The pallet elevator, generally stated, comprises a pallet elevator carriage 344 mounted for up-and-down movement on the main support frame of the palletizer, a section of wire mesh conveyor 346 attached to the pallet elevator carriage 344 for movement therewith, and drive means 348 for raising and lowering the elevator carriage 344 and section of wire mesh conveyor 346.

As shown in FIG. 23, the elevator carriage 344 is a generally rectangular shaped framework fabricated from welded metal plates. A front mounting plate 349 is provided for attaching the section of wire mesh conveyor 346 to the elevator carriage 344 utilizing threaded fasteners. A set of inclined cam follower-type roller bearings 350 and a set of oppositely inclined bearings 351 are freely rotatably mounted on mounting studs at each end of the elevator carriage 344 for supporting the carriage for up-and-down movement. A pair of parallel spaced vertical channel members 352 and 353 are provided on the main support frame of the palletizer as guide tracks for the bearings 350 and 351. The bearing sets 350 and 351 are oppositely inclined to be retained between opposite flanges of the channel members for movement along the channel members 352 and 353. The elevator carriage 344 is thus supported on the main support frame of the palletizer for being raised or lowered.

The section of wire mesh conveyor 346 for the pallet elevator is shown in FIG. 22. The wire mesh conveyor 346 is supported by a frame that includes a pair of parallel spaced side rails 355 and 357 and a mounting plate 354 attached to side rail 357 for attaching the conveyor 346 to mounting plate 349 of the elevator carriage 344. A plurality of idler rollers 356 for the wire mesh conveyor are freely rotatable to the side rails 355 and 357.

In addition, a drive shaft 358 having a plurality of wire mesh sprockets mounted thereon is drivably mounted at the head end of the conveyor section. A tail shaft 360 having a plurality of wire mesh sprockets mounted thereon is freely rotatably mounted at the tail end of the conveyor section 346. Drive shaft 358 is drivably coupled through a chain drive train 362 to an electric motor and reducer 364 mounted to the conveyor frame. The conveying surface of the conveyor section comprises an endless length of wire mesh conveyor 366 trained over the idlers 356 and sprockets on the drive 358 and tail 360 shafts for rotation by the drive shaft 358.

Referring again to FIGS. 19 and 20, the drive means 348 for the pallet elevator includes a reversible electric motor 368 for raising and lowering the elevator carriage 344 and section of wire mesh conveyor 346, an electric brake 370 for stopping the motor 368, and a reducing gear box 372 coupled to the electric motor 368. In one form of the invention a six-horsepower, 1800 rpm, three-phase, 60 Hz, 230/460 volt, reversible electric motor with a 215 UD frame is utilized as the motor 368. A helical worm reducer having a selected reduction ratio is utilized as the reducing gear box 372. The electric motor 368 and reducing gear box 372 are attached to the main support frame of the palletizer near the top of the elevator assembly.

An elevator drive shaft 380 is coupled to the output of the reducing gear box 372 supported for rotation by a pair of pillow block roller bearings 382 and 384 attached to the main support frame. Two drive sprockets 386 and 388 are attached to the drive shaft 380 for rotation therewith. In addition, a tail shaft 390 is freely rotatably mounted at the lower end of the elevator assembly supported for rotation by another pair of pillow block roller bearings 392 and 394 attached to the main support frame. A pair of idler sprockets 396 and 398 are attached to the tail shaft 390 for rotation therewith.

A pair of drive chains 400 and 401 are trained over the drive sprockets 386 and 388 and the idler sprockets 396 and 398, respectively. As shown in FIG. 24 for drive chain 400, the drive chains 400 and 401 are attached at both ends to two chain brackets 404 attached to the elevator carriage 344. One end link 406 of drive chain 400 is coupled directly to the chain bracket 404 utilizing a pin connection 407 through a bore in the chain bracket 404. The other end link 408 of the drive chain 400 is coupled with another pin connection 411 to a threaded tensioning stud 410 that is secured to another bore 412 through the chain bracket 404 by a spherical nut and washer 414.

With this arrangement rotation of the drive shaft 380 in a first direction by the elevating gear box 372 raises the elevator carriage 344 and wire mesh conveyor 346 for raising a pallet load. Rotation of the drive shaft 380 in the opposite direction lowers the elevator carriage 344 and wire mesh conveyor 346 for lowering a pallet load.

A normally open photoeye LD-P is positioned to detect layer position to enable the stripper plates to close. A normally open limit switch PL-T is positioned to sense the pallet elevator in the top position. A normally open limit switch PL-B senses the pallet elevator in the bottom position.

EMPTY PALLET MAGAZINE AND CONVEYOR

Figure 25:
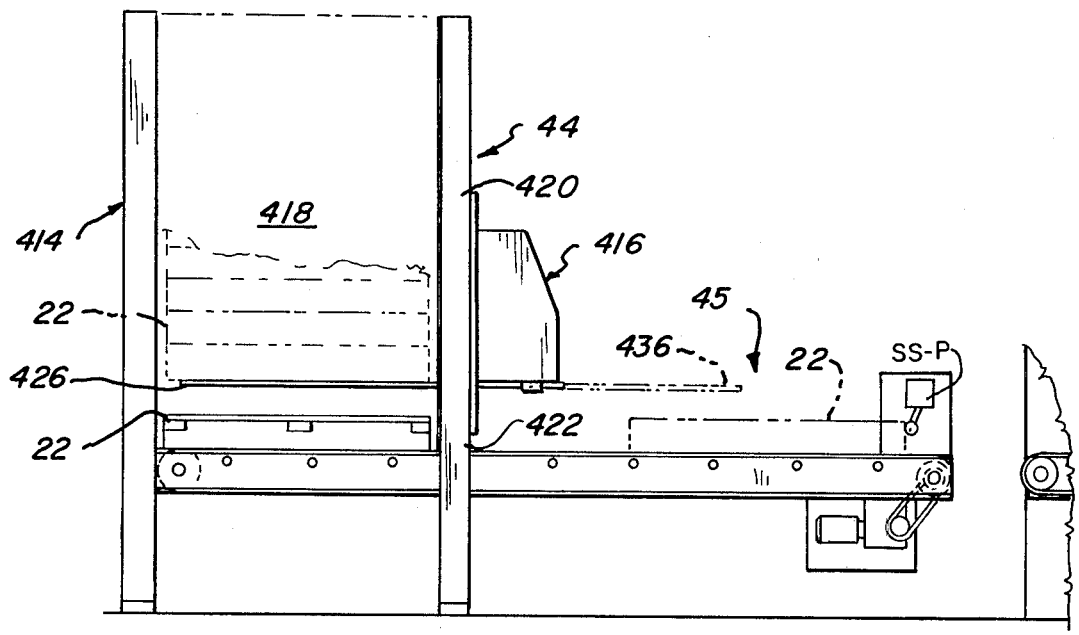
FIG. 25 is a side elevation view of the empty pallet magazine and empty pallet conveyor for the palletizer shown in FIG. 3.

Referring now to FIGS. 25 and 26, the empty pallet magazine 44 and empty pallet conveyor 45 are shown. The empty pallet magazine 44, generally stated, comprises a tubular steel frame 414 enclosed on two sides for stacking the pallets 22 and a pallet separation mechanism 416 for separating the pallets 22 one at a time as required from the magazine for transport by the empty pallet conveyor 45 to the pallet elevator 42. The empty pallet conveyor 45 is a conventional electrically powered wire mesh conveyor similar in construction to the wire mesh conveyor section 346 for the pallet elevator 42 previously described.

The frame 414 for the empty pallet magazine has a generally rectangular cross-sectional configuration to conform to the shape of a pallet and comprises welded tubular steel members enclosed on one end by a sheet metal end wall 418 and on one side by another sheet metal side wall 420. The structure is thus open on two sides, which permits pallets to be easily stacked by hand or by a fork lift into the pallet magazine 44. Side wall 420 of the pallet magazine 44 is spaced a distance away from the top of the empty pallet conveyor 45, forming a generally rectangularly shaped opening 422 (FIG. 25) for discharging the pallets from the magazine 44 upon rotation of the empty pallet conveyor 45.

Referring now to FIGS. 27 and 28, cross sections of the pallet separation mechanism 416 are shown. The pallet separation mechanism 416, generally stated, comprises a pair of fork tines 424 and 426 mounted for vertical and lateral movement for separating a single pallet 22 from the pallet magazine onto the empty pallet conveyor 45 for discharge from the magazine 44. Drive means for the fork tines 424 and 426 includes a pneumatic cylinder 428 (FIG. 28) attached to a movable support carriage 429 for moving the fork tines vertically up and down, and an electric gear motor 430 drivably coupled through a drive gear 432 to a gear rack 434 (FIG. 27) on fork tine 426 for moving the fork tines laterally in and out.

The fork tines 424 and 426 are similar in construction to the fork tines utilized on fork lift trucks or the like and have a generally rectangular cross-sectional configuration. The fork tines 424 and 426 are mounted approximately parallel to one another and are spaced apart to easily enter into the side openings of a pallet for supporting the stack of pallets. A cross brace 436 joins the two fork tines 424 and 426.

The fork tines 424 and 426 are supported for axial lateral movement by four sets of cylindrical rollers 438 freely rotatably mounted to the support carriage 429 to bear against the top and bottom surfaces of the fork tines. In addition, five cam rollers 440 are freely rotatably mounted to the support carriage 429 to bear against the sides of the fork tines for preventing the fork tines 424 and 426 from swaying laterally.

The electric gear motor 430 is fixedly mounted on the support carriage 429 adjacent to fork tine 426. The drive spur gear 432 is attached to the output shaft of the gear motor 430 in meshing engagement with the gear rack 434, which is attached to the side of fork tine 426. With this arrangement, rotation of the gear motor 430 in a first direction drives the fork tines outward from the pallet magazine for releasing a pallet. Rotation of the gear motor 430 in an opposite direction drives the fork tines into the pallet magazine for capturing a pallet.

The movable support carriage 429 is a generally U-shaped structure formed from a bottom plate 442 and two parallel spaced side plates 444 and 446 welded to the bottom plate 442 at right angles thereto. Four pairs of cam rollers 448 are freely rotatably mounted to the side plates 444 and 446 of the support carriage 429 for supporting the carriage for vertical movement. Two parallel spaced vertical wear strips 450 are attached to the frame 414 of the pallet magazine situated between the pairs of cam rollers 448 for guiding the cam rollers and supporting the support carriage. The pneumatic cylinder 428 for vertically moving the support carriage 429 is attached to a clevis connection 450 to the frame 414 of the pallet magazine and its cylinder rod is attached to a clevis connection 452 to bottom plate 442 of the support carriage 429. With this arrangement, extension of the pneumatic cylinder 428 lowers the support carriage 429 and fork tines 424 and 426 and retraction of the cylinder 428 raises the support carriage and fork tines.

At the beginning of the cycle of operation of the pallet separation mechanism 416, the fork tines 424 and 426 are positioned inside the lowermost pallet supporting the stack of pallets above the empty pallet conveyor 45, which is stationary. Additional pallets may be stacked directly onto the stack of pallets in the magazine 44 as required. To begin the cycle of operation, the fork tines 424 and 426 are lowered to position the stack of pallets directly on top of the empty pallet conveyor 45. The fork tines are then retracted out of the magazine 44 by rotation of the electric motor 430. When the fork tines 424 and 426 are fully retracted, the pneumatic cylinder 428 is slowly retracted to raise the fork tines.

When the fork tines are in position adjacent to the second pallet from the bottom of the stack, the pneumatic cylinder stops and the electric motor 430 is rotated for moving the fork tines 424 and 426 into the magazine 44 into position inside the second pallet. The pneumatic cylinder then continues to retract until the stack of pallets is lifted completely off the lowermost pallet. The empty pallet conveyor 45 will then be conveyed out of the magazine 44 to the pallet elevator or a ready position. The cycle may be repeated to supply single pallets as required.

A normally open, held closed, limit switch PS-O senses the forks in the fully retracted position. A normally open limit switch PS-I senses the forks in the full "in" position. A normally open limit switch PS-T senses the forks in the top position. A normally open limit switch PS-B senses the forks in the bottom position, and a normally open limit switch PS-P senses the forks at a position to enter the second pallet.

CONTROL AND OPERATION

Referring now to FIG. 29, there is shown a control for the several double-acting pneumatic cylinders above described. While pneumatic cylinders and associated controls have been used, it is understood that hydraulic or like fluid cylinders and related control elements may be used. The pressure line 459 from an air supply similar to the one shown in FIG. 7 supplies air under pressure to the pneumatic cylinders. The pneumatic cylinder 306 for the layer squaring has a flow line controlling the retraction of the cylinder rod regulated by a flow control valve 461 and a flow line controlling the extension of the cylinder rod controlled by a flow control valve 460.

Between these two flow control valves 460 and 461 and the fluid pressure line 459 there is an electro-pneumatic operator 462 in the form of a four-way, two-position valve 462 with cylinder lines designated A and B, exhaust designated E, and pressure designated P which is coupled to pressure line 459. This operator 462 has a bias spring SP and an electric solenoid SO. The solenoid SO upon actuation sets operator 462 for fluid flow for movement of the cylinder rod in the pneumatic cylinder 306 in one direction and spring SP moves the operator for fluid flow in the opposite direction when the solenoid is not energized.

The pneumatic cylinder 321 for the stripper plates has control valves in the two cylinder lines similar to 460 and 461 above described and uses an electro-pneumatic operator 463. The pneumatic cylinder 180 for bag turning has two cylinder line valves and an electro-pneumatic operator 464. The pneumatic cylinder 428 for the pallet separator has cylinder line valves and an electro-pneumatic operator 465. The operation of these operators is described more fully hereinafter.

In general, the entire control for the apparatus above described may be separated into an input block which would include limit switches, pushbuttons and pressure switches, a programmable controller block coupled to the output of the input block which would include a program memory, counters and timers, and an output block coupled to the output of the programmable controller block which would include solenoids, motor starters, alarms, and indicators.

The control for the turntable 154 and layer pusher 220 is further illustrated in FIG. 30. Photoeyes LS-1 and LS-2 are operatively associated with the bag infeed conveyor 30. An output from photoeye LS-1 is applied to an input module, which also receives inputs from limit switches TD-I, TD-U and TD-D. The output of the input module is coupled to a processor which includes a bag counter 472 and a memory 473 that is a program for a selected bag pattern. The bag counter counts from 0 to 10 and resets to 0.

One output from the bag counter 472 is applied to an output module for the turntable 154 controlling a pneumatic solenoid 476 to raise the turntable, an electric solenoid 477 to index, and a pneumatic solenoid 478 to lower the turntable.

Another output from the bag counter is applied to an output module for the layer pusher motor and reducer 242, shown as having a coil 491 and contact 492 controlling the motor for a full push and a coil 493 and contact 494 controlling the motor for a half push.

In the operation, the bags enter the system from belt conveyors onto the bag infeed conveyor 30 which is controlled by the two photoeyes, LS-2 located on the bag infeed conveyor and LS-1 located on the center line of the turning device. The bag infeed conveyor will stop if both photoeyes LS-1 and LS-2 are blocked simultaneously. The upstream conveyors will continue to run until photoeye LS-3 is blocked. The upstream conveyors will restart automatically when photoeye LS-3 becomes clear.

The bag now enters the palletizer. As the bag blocks photoeye LS-1 it is counted. The bag count determines if and how a bag is to be turned. Bags Nos. 1, 2 and 3 are turned 90°. Bags Nos. 5 and 7 are turned 180°. Bags Nos. 4 and 6 are not turned. Bags Nos. 8, 9 and 10 are turned 270°.

If the bag is to be turned, the pneumatic cylinder 180 which raises the turntable 154 will be actuated as the bag blocks photoeye LS-1, thus raising the bag above the roller surface. Photoeye LS-1 energizes a time delay which permits the bag to reach the proper position on the turntable 154 before it is raised. The turntable actuates a limit switch TD-U when it reaches the up position, which energizes the electric solenoid 477 of the clutch-brake unit 188, releasing the stop dog permitting the turntable to rotate. The turntable 154 will rotate through the proper number of 90-degree indexes and then the solenoid 477 of the clutch-brake unit 188 is de-energized, which locates the stop dog to stop the turntable at the proper position.

The layer pusher makes two pushes for each layer. The half layer push occurs after bag No. 3 on the basic layer and after bag No. 7 on the alternating layer. The half push cycle is initiated by bag No. 3 or bag No. 7 as it blocks photoeye LS-1. The pusher motor 242 is not energized until a half pusher timer in the circuit times out. This occurs 1.2 seconds after the bag leaves photoeye LS-1. The pusher makes a complete cycle on the half layer push, returning to the home position.

The full layer push occurs after bag No. 5 on the basic layer and after bag No. 10 on the alternating layer. The full layer push cycle is initiated by bag No. 5 or bag No. 10 as it blocks photoeye LS-1. The pusher motor is not energized until a full pusher timer in the circuit times out. This occurs 1.2 seconds after the bag leaves photoeye LS-1. The pusher travels until it actuates layer pusher end limit switch. The layer pusher now acts as the fourth side as the layer of bags is stripped onto the pallet. The pusher continues to its home position when the stripper plates reach full open.

The layer strip cycle is initiated by the pusher actuating a layer pusher end limit switch. The layer squaring plate is immediately energized and extends to form the layer to the proper dimensions. The layer squaring plate remains extended during the stripping cycle.

The stripper plates open after a period of time after the pusher reaches the layer pusher end limit switch. The amount of time is controlled by a stripper plate timer in the circuit. The purpose of the stripper plate timer is to permit the layer squaring plate to reach its extended position before the stripper plates open.

The stripper plates are opened by pneumatic cylinder 321. Both stripper plates are directly connected to the chain and sprocket arrangement, as above described, so that the stripper plates open and close simultaneously.

Referring now to FIG. 31, the reversible elevator motor 368 is shown to receive three-phase electric power at terminals T1, T2 and T3. One set of line contactors designated UP is controlled by coil 483 and applies line voltage to the motor terminals to cause the motor to drive in the up direction. Another set of line contactors designated DOWN is controlled by coil 482 causing the motor 368 to drive in the down direction in a conventional manner. Current for the common power line L2 to the motor is sensed by a current sensor 481 which in turn controls the actuation of a current sensor relay coil CS-1. Relay coil CS-1 in turn controls contacts for the up, down operations for the motor.

The photoeye LD-P and relay coil LD-P1 are connected in series across power terminals P1 and P2. Coil LD-P1 has a contact LD-P2. Contact LD-P2 is in series with a limit switch SP-O controlling current to the down coil 482. A time delay LJ-T in series with normally closed contact CS-2 of the current sensor relay also controls current to down coil 482. In addition there is a limit switch SP-C and a normally closed contact CS-3 of the current sensor coil controlling current to the UP coil 483.

When the stripper plates are in the fully open position the limit switch SP-O is actuated, then down coil 482 is energized, and the elevator conveyor containing the palletized unit is lowered until the top of the palletized unit clears a photoeye LD-P. At this time the electric brake 370 on the elevator drive engages, de-energizes the motor, and holds the elevator conveyor and palletized unit in this position. Simultaneously, the stripper plates 40 close and the layer squaring plates return to the home position.

When the stripper plates are completely closed, limit switch SP-C is actuated and the elevator conveyor raises, compressing the entire palletized unit against the underside of the stripper plates 40. The layer compression cycle is a momentary compression and the extent of compression is adjustable through the current sensor 481 (MEK 2137-BB load control). The motor rotates to move the elevator up until the motor stalls, increasing the motor current until current sensor 481 trips. At the same time, the motor is plug-reversed for a short time leaving the layer jog timer LJ-T energizing the down coil 482 to provide the proper clearance between the stripper plates and bags. This control arrangement senses rate of change of motor current as the motor stalls, achieving essentially a uniform compression for each layer even though the pallet load and running current increase with each layer.

When the current sensor 481 shuts off the elevator drive motor 368, the reversing motor starter is immediately energized and lowers the elevator conveyor and palletized unit to provide clearance between the top of the palletized unit and the underside of the stripper plates. The amount of this drop is adjustable through a layer jog timer LJ-T and is set to allow approximately one-half to one inch clearance.

The pallet elevator essentially has a four-mode sequence: (1) Clear—the motor 368 is not running and is ready for an empty pallet; (2) Raise—the motor 368 runs to raise the empty pallet to the top position for each and every layer compression; (3) Load—the motor 368 is not running, the empty pallet is present to receive the required number of layers; and (4) Down—the motor runs to drop the layer to clear the stripper plates, to relieve compression, and to run the full pallet down to the bottom.

The elevator conveyor and palletized unit remain in the lower position until the next layer is deposited (stripper plates open), and the cycle repeats itself until the present number of layers is reached. After the last layer is compressed, the elevator conveyor and palletized unit lower to the home position, energizing limit switch PL-B and thus providing the signal to convey the palletized unit out of the elevator frame.

As the previous pallet is being loaded, another empty pallet is automatically separated out of the pallet magazine and conveyed on the empty pallet conveyor to a slip-sheet magazine position. This apparatus is specifically adapted for adding a slip-sheet magazine and applicator located downstream of the pallet magazine to put a slip sheet on each pallet prior to loading thereon.

When the entire stack of pallets in the pallet magazine is lowered until the stack is on the empty pallet conveyor, the limit switch PS-B is actuated and provides a signal to power the fork tines out of the pallet magazine. The fork tines retract until limit switch PS-O is actuated. When this occurs the tines are raised until the limit switch PS-P is energized.

At this point the tines are in a position where they are powered back into the pallet magazine and engage into the second pallet from the bottom of the stack. The end of the tine travel is registered when limit switch PS-I is actuated. Immediately the tines are raised to the highest point and limit switch PS-T is actuated. When the pallets are in this raised position there is clearance between the bottom pallet and the remainder of the stack.

When limit switch PS-T is actuated, the empty pallet conveyor starts and conveys the bottom pallet from the pallet magazine to a slip-sheet position. After the pallets have been conveyed out of the pallet magazine they pass under the slip-sheet magazine (not shown) and are stopped at a point just beyond the slip-sheet magazine after the pallet breaks the beam of photoeye SS-P. At this point the slip-sheet magazine would be operated.

From the foregoing description it is apparent that the palletizer with the stripper plate arrangement and turning device which allows turning greater than 90° is capable of doing a multiplicity of layer patterns, the layer compression is essentially uniform even though the pallet load and motor current increase, and the pallet magazine will accommodate various types of pallets and bags with minimum adjustments. The bag flattener affords uniform distribution of product and is readily adjustable for various bag thicknesses.

Although the present invention has been described with a certain degree of particularity, it is understood that the present disclosure has been made by way of example and that changes in details of structure may be made without departing from the spirit thereof.

What is claimed is:

1. In bag handling apparatus, the combination comprising:
   first means for flattening and distributing the material in a bag;
   second means for metering a plurality of the bags in a series at spaced intervals at a controlled rate;
   third means for turning the bags through selected angles to orient the bags for selected layer patterns, said third means rotating said said bags in increments of either 90°, 180° or 270° from any starting point;
   fourth means for squaring and compacting the bags forming the selected layer pattern;
   fifth means for depositing the layer pattern of bags onto a pallet;
   sixth means for vertically compressing each layer as a stack of layers on the pallet after deposit onto said pallet, said sixth means for vertically compressing including a reversible electric drive motor arranged for raising and lowering the pallet with layers thereon and a control having a sensor for sensing the rate of change of current drawn by said drive motor while raising the pallet for automatically operating said motor responsive to the load on said motor resulting from a layer being compressed whereby, after a preselected compressing force is applied, said motor is stopped and reversed for applying a substantially uniform compression to each layer independently of the number of layers on the pallet; and
   seventh means for providing a pallet, one at a time, for each loading cycle.

2. In bag handling apparatus as defined in claim 1 wherein said fifth means includes:
   first and second plates mounted for movement between a closed position and an open position; and
   drive means including a motive power source, a first coupling between said motive power source and said first plate to move said first plate between said first and second positions, and a second coupling between said first plate and said second plate wherein said second plate is moved simultaneously with and in an opposite direction to the movement of said first plate.

3. In bag handling apparatus as defined in claim 1 wherein said sixth means includes:
   stripper plate means onto which layer patterns of bags are deposited for delivery to a pallet;
   elevator means including a carriage supporting a pallet arranged to move between an up position and a down position and carriage drive means for moving said carriage and pallet between up and down positions; and
   control means for said carriage drive means for regulating the movement of said carriage and pallet whereby, after each layer pattern of bags is deposited from said stripper plate means onto said pallet, said stripper plate means is moved to a closed position and said bags on said pallet are moved up by the movement of said carriage to vertically compress the bags on the pallet, followed by being moved down in increments as layer patterns of bags are successively stacked onto a pallet.

4. In a bag palletizer for arranging and stacking bags of material on pallets, the combination comprising:
   conveying means for feeding bags of material at a controlled rate;
   bag turning means for turning the bags for orienting the bags to form a predetermined layer pattern including a turntable for supporting the bags for turning, a live roller conveyor section for conveying bags onto and off said turntable, and a combination rotary and linear motor actuator coupled to said turntable extendable by the operation of a drive means and control for raising said turntable and rotating said turntable in predetermined increments, said drive means including a rotary drive motor to rotate said actuator having an indexing means for rotating said actuator, said indexing means indexing in three successive 90-degree increments in the same direction from any starting point for rotating said turntable in selected increments of 90°, 180° or 270° from said starting point;
   a pair of stripper plates separable from one another for depositing formed layer patterns of bags onto a pallet; and
   elevator means for raising pallets into position under said stripper plates and for incrementally lowering the pallets as layer patterns as bags are stacked onto a pallet.

5. The bag palletizer as defined in claim 4 wherein said control means includes a counter having a photo-eye sensor for counting bags and assigning a count number to each bag and a memory selectively programmed to actuate said turntable to rotate the bags through selected angles of 90°, 180°, or 270° depending on their count number.

6. The bag palletizer as defined in claim 5 and further comprising layer squaring means for squaring the formed layer patterns of bags on said stripper plates.

7. In a bag palletizer for arranging and stacking bags of material on pallets, the combination comprising:

conveying means for feeding bags of material at a controlled rate;

bag turning means for turning the bags for orienting the bags to form a predetermined layer pattern including a turntable for supporting the bags for turning, a live roller conveyor section coupled to said conveying means for conveying bags onto and off of said turntable, and a combination rotary and linear motion actuator coupled to said turntable extendable by the operation of a control circuit for raising said turntable and mechanically rotatable by an electric rotary drive motor coupled to an indexing means for rotating the turntable in predetermined increments, said indexing means serving to selectively rotate said turntable in three successive 90-degree increments in the same direction from any starting point for rotating said bags in increments of 90°, 180° or 270° from said starting point;

a live roller conveyor load table coupled to said bag turning means live roller conveyor wherein the oriented bags are formed into a layer pattern;

a pair of stripper plates separable from one another for depositing formed layer patterns of bags onto a pallet;

pusher means for pushing the formed layer patterns of bags from said live roller conveyor load table onto said stripper plates;

elevator means for raising pallets into position under said stripper plates and for incrementally lowering the pallets as layer patterns of bags are stacked onto a pallet, said elevator means including a reversible drive motor and a control for automatically operating said motor responsive to the load on said motor resulting from a layer being compressed whereby, after a preselected compressing force is applied, said motor is stopped and reversed for applying a substantially uniform compression to each layer independently of the number of layers;

means for supplying single pallets to said elevator means for loading;

full pallet conveying means for conveying full pallets from said elevator means; and control means for selectively operating said bag turning means, stripper plates, pusher means, elevator means, pallet supplying means and second conveying means in a continuous sequence to palletize said bags and remove formed units of palletized bags.

8. In a bag palletizer as set forth in claim 7 wherein said pusher means includes:

a pusher plate adapted to travel back and forth on a carriage between a home position and an extended position; and drive means for moving said plate and carriage between said positions in a push cycle and a return cycle, said pusher plate being mounted to be disposed in a lowered position during the push cycle and in a raised position during the return cycle, said drive means including at least one endless chain on opposed sprockets and having an upper strand and a lower strand, said carriage and pusher plate being attached to said chain whereby when the attachment of said plate to said chain is along said upper strand the pusher plate is in the lowered position during a push stroke and when the attachment of said plate is along said lower strand the pusher plate is in the raised position during a return stroke, said pusher plate moving down and away from the pushed bag at the end of the push stroke and the beginning of the return stroke.

9. In a bag palletizer as defined in claim 8 wherein said pusher plate has an arm with an intermediate portion pivotally connected to said carriage and an end portion connected to said chain and further including a drive motor for continuously driving said chain is only one direction during the operation of said pusher plate.

10. In apparatus as defined in claim 7 wherein said supplying means and full pallet conveying means includes:

conveying means having a conveying surface operable for conveying the empty pallets;

a pallet magazine for storing stacks of pallets having a side wall mounted along one side of said conveying means and an end wall mounted across said conveying means above said conveying surface to form an opening large enough to pass pallets therethrough;

a pair of fork tines for supporting one or more pallets above said conveying surface within said pallet magazine and mounted for up-and-down motion for raising and lowering pallets and for axial lateral movement into and out of said pallet magazine for releasing the capturing pallets;

drive means for raising and lowering said fork tines;

drive means for axially laterally extending are retracting said fork tines into and out of said pallet magazine; and control means for selectively operating said raising and lowering drive means, said extending and retracting drive means, and said conveying means, whereby pallets may be stacked onto said fork tines, and said fork tines lowered to position a lowermost pallet on top of said conveying surface, retracted out of said magazine to release the lowermost pallet, raised a first time to a position adjacent a second lowermost pallet, extended into said magazine to capture the second lowermost pallet, raised a second time to support the stack of pallets above said conveying surface, and said conveying means may be actuated to convey the lowermost pallet out of said magazine through said rectangular opening.

11. Apparatus as defined in claim 10 wherein said conveying surface is a section of wire mesh conveyor belting.

12. Apparatus as defined in claim 10 wherein said raising and lowering drive means is a pneumatic cylinder.

13. Apparatus as defined in claim 10 wherein said extending and retracting drive means is an electric gear motor drivably coupled to a gear rack attached to one of said fork tines.

14. Bag flattening apparatus for flattening and distributing material in a bag comprising, in combination:

first conveying means having a first conveying surface for travel at a selected speed for conveying said bags;

second conveying means spaced apart from and approximately parallel to said first conveying means and having a second conveying surface for travel at approximately said selected speed for flattening said bags; and mounting means for movably mounting said second conveying means with respect to said first conveying means such that said bags are conveyed between said first and second conveying surfaces and compressed by the weight of said second conveying means against said first conveying means, said mounting means including a parallelogram-type linkage attached to said first and second conveying means, a stationary support member attached to said first conveyor, a movable support member attached to said second conveyor via said linkage, and a pneumatic actuator charged with compressed air at a selected pressure mounted between said stationary and movable support members, said stationary and movable support members being disposed such that the weight of the upper conveying means tends to compress said pneumatic actuator and an expansion of said pneumatic actuator by increased pressure raises said upper conveying means whereby to serve to dispose said first and second conveying means at a selected distance from one another and to provide a flexible means of support for the upper conveying means with respect to the lower conveying means by having movement between said attachments at opposite ends to said support members during the passage of bags between said first and second conveying means.

15. Bag flattening apparatus as defined in claim 14 wherein the air pressure in said pneumatic actuator is adjustable for varying the spacing between said first and second conveying means for different bag sizes.

16. Bag flattening apparatus as defined in claim 14 wherein said first and second conveying means are mounted at an incline.

17. Bag flattening apparatus for flattening and evenly distributing material within the bags comprising:

a first conveyor having a first conveying surface traveling at a selected speed;

a second conveyor having a second conveying surface traveling at approximately said selected speed; and a linkage for pivotally mounting said second conveyor on said first conveyor such that said first and second conveying surfaces are spaced a selected distance apart substantially parallel to one another and a bag is conveyed between said first and second conveying surfaces and compressed by the weight of said first conveyor against said second conveyor, said linkage including a stationary support member attached to said first conveyor, a movable support member attached to said second conveyor, and a pneumatic actuator mounted between said support members charged with compressed air at a selected pressure, said stationary and movable support members being disposed such that the weight of the second conveyor tends to compress said pneumatic actuator and an expansion of said pneumatic actuator by increased pressure raises said second conveyor whereby to serve to maintain said first and second conveyors at a selected distance from one another and to provide a flexible means of support for the second conveyor with respect to the first conveyor by having movement between said said attachments at opposite ends of said support members during the passage of bags between said first and second conveyors.

18. Bag flattening apparatus as defined in claim 17 wherein at least two pneumatic actuators are mounted side-by-side between said support members to maintain said first and second conveyors at a selected distance.

19. Bag flattening apparatus as defined in claim 17 including control means for regulating the pressure in said pneumatic actuator.

20. Bag turner apparatus for turning and orienting bags of material to form a predetermined pattern arrangement comprising:

a turntable;

conveying means having a conveying surface for conveying bags onto and off said turntable;

a combination rotary and linear actuator having a cylinder rod coupled to said turntable extendable and retractable for raising said turntable above said conveying surface and rotatable for rotating said turntable for turning the bags;

first drive means for extending and retracting said cylinder rod for raising and lowering said turntable;

second drive means for rotating said cylinder rod in predetermined increments including a rotary drive motor coupled to said cylinder rod through an indexing means for rotating said actuator, said indexing means indexing in three successive 90-degree increments in the same direction from any starting point for rotating said turntable in selected increments of 90°, 180° or 270° from said starting point; and control means operable for actuating said first drive means for selectively raising and lowering said turntable and operable for actuating said indexing means for selectively rotating said turntable in said predetermined increments.

21. Bag turner apparatus as defined in claim 20 wherein said control means includes a bag counter having a photo-eye sensor for counting the bags and a memory selecting bag count for actuating said second drive means based on the bag count to rotate a counted bag a predetermined increment.

22. Bag turner apparatus as defined in claim 20 wherein said linear actuator and said first drive means are pneumatic.

23. Bag turner apparatus as defined in claim 20 wherein said second drive means is mechanical.

24. Bag turner apparatus as defined in claim 20 wherein said indexing means is a clutch-brake.

25. Bag turner apparatus as defined in claim 20 wherein said conveying means is a section of live roller conveyor having a plurality of parallel spaced powered rollers and said turntable is nestable on said live roller conveyor below the top surfaces of said rollers.

26. Bag turner apparatus as defined in claim 25 wherein said turntable is a grid-like structure.

27. Bag turner apparatus for turning and orienting the bags for forming a predetermined layer pattern comprising:

a section of live roller conveyor having a plurality of parallel spaced powdered rollers;

a turntable nestable on said powdered rollers below the top surfaces of said rollers for receiving conveyed bags from said rollers and mounted for up-and-down movement for raising bags off of the rollers and for rotational movement for turning the bags;

a combination linear and rotary motion pneumatic actuator having a cylinder rod coupled to said turntable extendable and retractable for raising and lowering said turntable, and rotatable for rotating said turntable;

pneumatic drive means coupled to said pneumatic actuator for pneumatically extending and retracting said cylinder rod;

mechanical drive means for rotating said cylinder rod including a rotary drive motor drivably coupled to said cylinder rod through a solenoid-operated 90-degree indexing clutch-brake; and control means including a bag counter having a photoelectric eye sensor for counting bags and a programmable memory for selectively actuating said pneumatic drive means and said mechanical drive means to lift and rotate said turntable in three successive 90-degree increments in the same direction from any starting point for rotating said turntable in increments of 90°, 180°, or 270° depending on the count of a bag of orienting the bags in a predetermined pattern.

28. Bag turner apparatus as defined in claim 27 wherein said section of live roller conveyor is coupled to a metering section of conveyor for metering the bags onto the live roller conveyor at a controlled rate.

29. Bag turner apparatus as defined in claim 28 wherein said live roller conveyor is coupled to a live roller conveyor load table wherein the oriented bags are accumulated for forming the layer patterns.

30. Stripper plate apparatus for depositing a layer pattern of bags of material onto a pallet comprising:

first and second plates mounted for movement between a closed position and an open position, said first and second plates being of a corresponding size and shape and disposed for coplanar sliding movement in linear ball bushings; and drive means on one side of said plates only including a motive power source, a first coupling between said motive power source and said first plate to move said first plate between said first and second positions, and a second coupling between said first plate and said second plate wherein said second plate is moved simultaneously with and in an opposite direction to the movement of said first plate, said motive power source being in the form of a pneumatic cylinder having a cylinder rod that moves between an extended and a retracted position, said first coupling being in the form of a connector between said cylinder rod and said first plate and arranged whereby as the cylinder rod is extended said first plate is moved toward the open position and as the cylinder rod is retracted said first plate is moved toward the closed position, said second coupling being in the form of a single endless chain mounted on opposed sprockets on one side of said plates only, said cylinder rod moving said chain which in turn moves said second plate simultaneously with and in an opposite direction to said first plate.

31. Stripper plate apparatus as set forth in claim 30 wherein in said closed position adjacent edges of said plates abut against one another and in said open position said plates are separated a selected distance from one another along a parting line to permit a layer pattern of bags to pass therebetween.

32. Stripper plate apparatus as set forth in claim 30 including first means for sensing the plates in the closed position and second means for sensing the plates in the open position.

33. Pallet layer compressing apparatus comprising:

stripper plate means onto which layer patterns of bags are deposited for delivery to a pallet;

elevator means including a carriage supporting a pallet arranged to move between an up position and a down position and carriage drive means for moving said carriage and pallet between up and down positions; and control means for said carriage drive means for regulating the movement of said carriage and pallet whereby, after each layer pattern of bags is deposited from said stripper plate means onto said pallet, said stripper plate means is moved to a closed position and said bags on said pallet are moved up by the movement of said carriage to vertically compress the bags on the pallet, followed by being moved down in increments as layer patterns of bags are successively stacked onto a pallet, said carriage drive means including a reversible electric motor arranged for raising and lowering the pallet with layers thereon and a reversing motor control, said reversing motor control having a sensor for sensing the rate of change of current drawn by the electric motor arranged to de-energize and then reverse the motor for a selected time period after each layer compression of the layer patterns on the bag for a substantially uniform compression of each layer of the bags independently of motor current and number of bag layers.

34. Pallet compressing apparatus as set forth in claim 33 wherein the pallet compressor is adjustable via the adjustment of said sensor.

35. Pallet compressing apparatus as set forth in claim 33 wherein, when said sensor shuts off, the control is arranged to reverse the current to the electric motor to lower the pallet and to provide clearance between the top palletized layer and the underside of said stripper plate means.

36. Pallet compressing apparatus as set forth in claim 33 wherein said pallet is supported on a generally horizontal conveyor adapted to convey a completed palletized unit from said carriage after a selected number of layers of bags has been deposited and compressed.

37. Pallet compressing apparatus as set forth in claim 33 wherein said control means includes means to sense the pallet in the down position, means to sense the pallet in the top position, and means to detect an empty pallet in position on the carriage.

38. In bag handling apparatus, the combination comprising:

first means for flattening and distributing the material in a bag;

second means for metering a plurality of the bags in a series at spaced intervals at a controlled rate;

third means for turning the bags through selected angles to orient the bags for selected layer patterns, said third means rotating said bags in increments of either 90°, 180° or 270° from any starting point, said third means including:
a turntable,
conveying means having a conveying surface for conveying bags onto and off of said turntable,
a combination rotary and linear actuator having a cylinder rod coupled to said turntable extendable and retractable for raising said turntable above said conveying surface and rotatable for rotating said turntable for turning the bags,
first drive means for extending and retracting said cylinder rod for raising and lowering said turntable,
second drive means for rotating said cylinder rod in predetermined increments including a rotary drive motor coupled to said cylinder rod through an indexing means, and
control means operable for actuating said first drive means for selectively raising and lowering said turntable and operable for actuating said indexing means for selectively rotating said turntable in predetermined increments;
fourth means for squaring and compacting the bags forming the selected layer pattern;
fifth means for depositing the layer pattern of bags onto a pallet;
sixth means for vertically compressing each layer as a stack of layers on the pallet after deposit onto said pallet, said sixth means for vertically compressing including a reversible drive motor and a control for automatically operating said motor responsive to the load on said motor resulting from a layer being compressed whereby, after a preselected compressing force is applied, said motor is stopped and reversed for applying a substantially uniform compression to each layer independently of the number of layers; and
seventh means for providing a pallet, one at a time, for each loading cycle.

* * * * *